(12) United States Patent
Kurumatani et al.

(10) Patent No.: US 7,167,337 B2
(45) Date of Patent: Jan. 23, 2007

(54) MAGNETIC RECORDING AND REPRODUCING APPARATUS INCLUDING AN IDLER MOUNTED ON A MAIN CHASSIS

(75) Inventors: Hiroshi Kurumatani, Hyogo (JP); Kazuo Shibukawa, Osaka (JP); Koichiro Hirabayashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 400 days.

(21) Appl. No.: 10/809,145

(22) Filed: Mar. 25, 2004

(65) Prior Publication Data

US 2004/0228028 A1    Nov. 18, 2004

(30) Foreign Application Priority Data

Mar. 26, 2003   (JP) .............................. 2003-085048

(51) Int. Cl.
G11B 15/08    (2006.01)
G11B 15/26    (2006.01)

(52) U.S. Cl. ....................... 360/85; 360/74.6; 360/96.3; 360/96.5; 242/338.1

(58) Field of Classification Search .................. 360/85, 360/96.3
See application file for complete search history.

(56) References Cited

U.S. PATENT DOCUMENTS 4,907,110 A * 3/1990 Ando .......................... 360/85
5,081,549 A * 1/1992 Doutsubo .................. 360/74.1
5,191,490 A * 3/1993 Tyouno et al. .............. 360/71
5,903,412 A * 5/1999 Ide et al. .................... 360/96.3
6,288,865 B1 * 9/2001 Hirabayashi et al. ....... 360/96.3
6,567,234 B2 * 5/2003 Matsuoka et al. .......... 360/96.5
7,048,219 B2 * 5/2006 Kim et al. .................. 242/340
2003/0011924 A1 * 1/2003 Matsuoka et al. ............ 360/85

* cited by examiner

*Primary Examiner*—Jefferson Evans
(74) *Attorney, Agent, or Firm*—Renner, Otto, Boisselle & Sklar, LLP

(57) ABSTRACT

A magnetic recording and reproduction apparatus includes a sub chassis unit on which a cassette is mountable and having first and second reel stands respectively engageable with first reel and second reels of the cassette; a main chassis unit combined with the sub chassis unit and including a rotatable head cylinder used for information recording to, and/or information reproduction from, a magnetic tape; and an idler mounted on the main chassis unit for driving the first and second reel stands. The sub chassis unit further includes a reel lock release member for unlocking a reel lock member of the cassette; a light emitting device for emitting light for detecting a leading end and a trailing end of the magnetic tape; and a section for allowing the idler to be mounted on the main chassis unit after the sub chassis unit is combined with the main chassis unit.

6 Claims, 23 Drawing Sheets

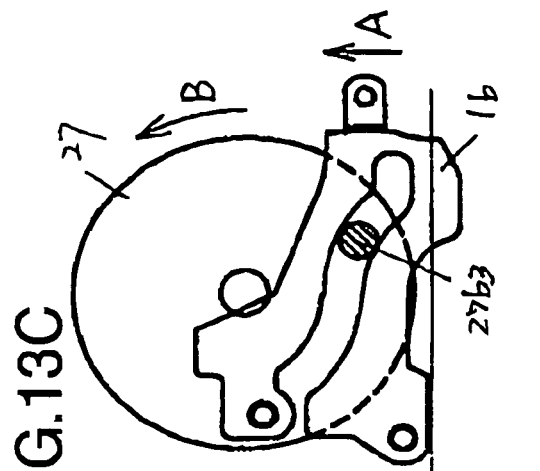
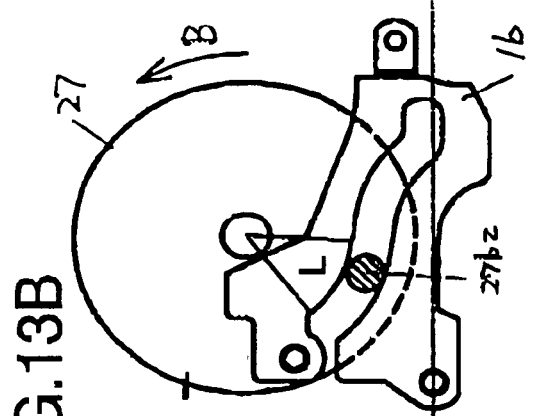
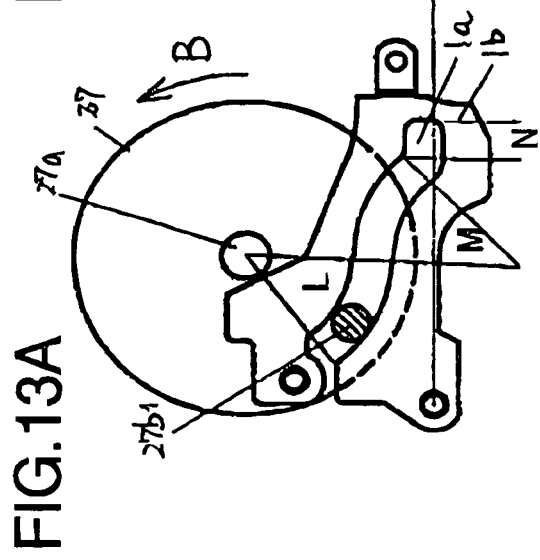
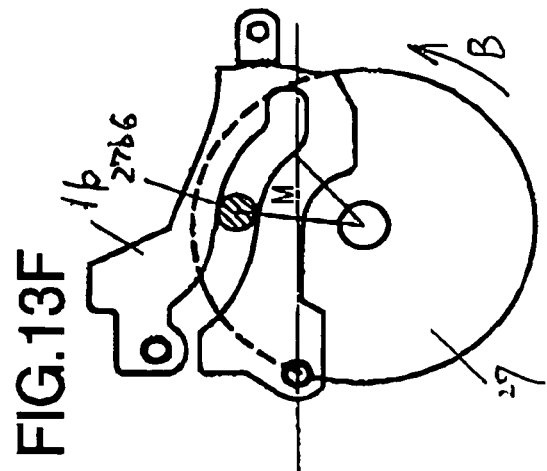
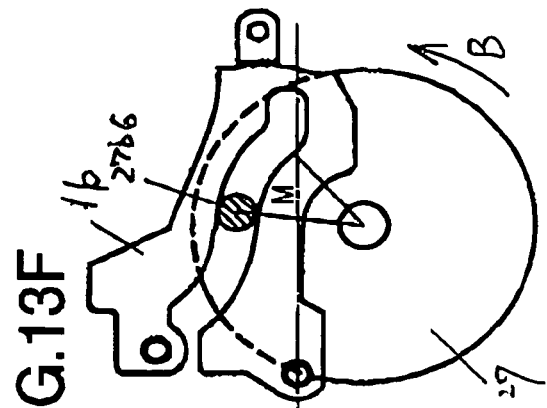
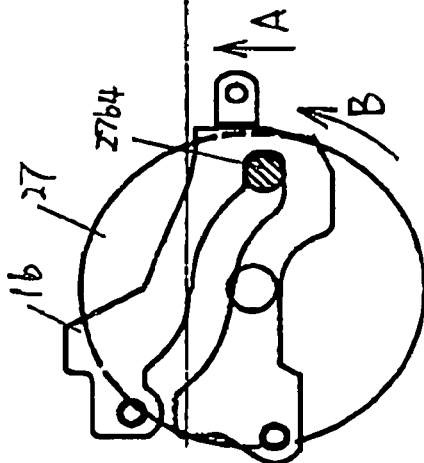

MAGNETIC RECORDING AND REPRODUCING APPARATUS INCLUDING AN IDLER MOUNTED ON A MAIN CHASSIS

This non-provisional application claims priority under 35 U.S.C., §119(a), on Patent Application No. 2003-085048 filed in Japan on Mar. 26, 2003, the entire contents of which are hereby incorporated by reference.

BACKGROUND OF THE INVENTION

1. Field of the Invention

The present invention relates to a magnetic recording and reproduction apparatus and a method for assembling the magnetic recording and reproduction apparatus. In particular, the present invention relates to a magnetic recording and reproduction apparatus for performing information recording and/or information reproduction with a tape being wound around a rotatable head cylinder over a prescribed angle, and a method for assembling such a magnetic recording and reproduction apparatus.

2. Description of the Related Art

Recently, magnetic recording and reproduction apparatuses used for video tape recorders and the like have been progressively reduced in cost and increased in performance.

In general, a magnetic recording and reproductions apparatus includes a sub chassis unit, a main chassis unit, and an idler, and is produced by assembling the sub chassis unit, the main chassis unit, and the idler.

Hereinafter, with reference to FIGS. 18 through 23, a conventional magnetic recording and reproduction apparatus 200 will be described.

FIG. 18 is a plan view of a sub chassis unit 250 of the conventional magnetic recording and reproduction apparatus 200. FIG. 19 is a plan view of a main chassis unit 260 of the conventional magnetic recording and reproduction apparatus 200. FIG. 20 is a plan view of a conventional idler 235. FIG. 21 is a plan view of a conventional cover plate 242. FIG. 22 is a plan view of an assembly of the sub chassis unit 250, the main chassis unit 260 and the idler 235. FIG. 23 is a plan view of the conventional magnetic recording and reproduction apparatus 200 which is obtained by assembling the sub chassis unit 250, the main chassis unit 260 and the idler 235 and then attaching the cover plate 242 to the sub chassis unit 250.

As shown in FIG. 18, the sub chassis unit 250 includes a sub chassis 201, four tape pull-out members 202, 206, 209 and 210 provided on the sub chassis 201, a supply reel stand (S reel stand) 211 rotatably provided on the sub chassis 201, and a take-in reel stand (T reel stand) 212 rotatably provided on the sub chassis 201.

As shown in FIG. 19, the main chassis unit 260 includes a main chassis 221, a capstan 231 provided on the main chassis 221, a capstan shaft 231*a* provided on the capstan 231, a drive gear 232, a timing belt 233, and a center gear 234.

In the state where a pinch roller (not shown) presses a tape to the capstan shaft 231*a*, the capstan shaft 231*a* rotates to drive the tape. A capstan gear 231*b* is integrally provided with the capstan 231.

The drive gear 232 is supported at an axis thereof by a rotation shaft 232*a* provided on the main chassis 221. The drive gear 232 includes an upper gear 232*b* and a lower gear 232*c*. The timing belt 233 is extended around the upper gear 232*b* and the capstan gear 231*b*.

The center gear 234 is supported at an axis thereof by a rotation shaft 234*a* provided on the main chassis 221. The center gear 234 includes an upper gear 234*b* and a lower gear 234*a*. The lower gear 232*a* of the drive gear 232 and the lower gear 234*c* of the center gear 234 are engaged with each other.

The idler 235 shown in FIG. 20 is to be mounted on the main chassis unit 260.

The idler 235 includes an idler arm 235*a* and an idler gear 235*c*.

In the assembled state of the magnetic recording and reproduction apparatus 200, the idler arm 235*a* is held by the main chassis 221 to be pivotable about a pivoting shaft 235*b*. The idler gear 235*c* is held by the idler arm 235*a* to be rotatable with a rotation shaft 235*d* as the center of rotation. The idler gear 235*c* is pressed by an idler gear pressing section (not shown), thereby generating a rotation load torque in the idler gear 235*c*.

As shown in FIG. 21, the cover plate 242 has a reel lock release member 242*a* on a top surface thereof. In the assembled state of the magnetic recording and reproduction apparatus 200, the reel lock release member 242*a* is inserted, into a cassette mounted on the sub chassis unit 250 and releases a reel lock mechanism provided in the cassette. An LED 242*b* is inserted into the cassette. Light emitted by the LED 242*b* passes through the tape in the cassette and then is sensed by photosensors (not shown) provided on both sides of the sub chassis 201. Thus, a leading end and a trailing end of the tape are detected.

FIG. 22 is a plan view of an assembly of the sub chassis unit 250, the main chassis unit 260 and the idler 235. In this example, the sub chassis unit 250 shown in FIG. 18 is stacked on the main chassis unit 260 shown in FIG. 19, and then the idler 235 for driving the supply reel stand 211 and the take-in reel stand 212 of the sub chassis unit 250 is mounted such that an axis of the idler 235 is supported by the main chassis unit 260.

FIG. 23 is a plan view of the conventional magnetic recording and reproduction apparatus 200 which is obtained by assembling the sub chassis unit 250, the main chassis unit 260 and the idler 235 and then attaching the cover plate 242 to the sub chassis unit 250. In other words, after the state shown in FIG. 22 is obtained, the cover plate 242 shown in FIG. 21 is attached to the sub chassis unit 250.

The cover plate 242 includes the reel lock releaser member 242*a* for releasing the reel lock mechanism in the cassette (not shown) and the LED 242*b* which is alight emitting device for detecting a leading end and a trailing end of the tape. Since the reel lock release member 242*a* and the LED 242*b* are inserted into the cassette when the magnetic recording and reproduction apparatus 200 is used, the reel lock release member 242*a* and the LED 242*b* need to be provided at a position closest to the cassette. Therefore, the reel lock release member 242*a* and the LED 242*b* need to be provided between the idler 235, for driving the supply reel stand 211 and the take-in reel stand 212, and the cassette.

The conventional magnetic recording and reproduction apparatus 200 needs to be assembled in the following manner. The main chassis unit 260 and the sub chassis unit 250 are assembled, then the idler 235 is mounted, and the cover plate 232 including the reel lock release member 242*a* and the LED 242*b* is attached to the sub chassis unit 250. Alternatively, the main chassis unit 260 and the sub chassis unit 250 are assembled, then the idler 235 is mounted, and the reel lock release member 242*a* and the LED 242*b* are attached to the sub chassis unit 250.

The LED 242*b* usually includes a flexible printed circuit board or the like attached by soldering for electric connections, and thus is large in size including a large number of components and requires a large number of steps to assemble. In consideration of the distribution costs required for assembling the components and comprehensive quality control, it is desirable that a magnetic recording and reproduction apparatus includes large units. For disassembly for maintenance or the like, it is desirable that a magnetic recording and reproduction apparatus is divided into large units. According to the structure of the conventional magnetic recording and reproduction apparatus 200, It is impossible to attach the reel look release member 242a and the LED 242b to the sub chassis 250 before the sub chassis 250 and the main chassis 260 are assembled. For this reason, the sub chassis 250 cannot be a large unit.

SUMMARY OF THE INVENTION

According to one aspect of the invention, a magnetic recording and reproduction apparatus includes a sub chassis unit on which a cassette, including a magnetic tape, a first reel, a second reel, and a reel lock member for locking the first reel and the second reel, is mountable, the sub chassis unit including a first reel stand engageable with the first reel and a second reel stand engageable with the second reel; a main chassis unit combined with the sub chassis unit, the main chassis unit including a rotatable head cylinder used for recording information to, and/or reproducing information from, the magnetic tape; and an idler mounted on the main chassis unit for driving the first reel stand and the second reel stand. The sub chassis unit further includes a reel lock release member for unlocking the reel lock member of the cassette in the state where the cassette is mounted on the sub chassis unit; a light emitting device for emitting light for detecting a leading end and a trailing end of the magnetic tape in the state where the cassette is mounted on the sub chassis unit; and a section for allowing the idler to be mounted on the main chassis unit after the sub chassis unit and the main chassis unit are combined together.

In one embodiment of the invention, the reel lock release member and the light emitting device are included in the section, and the reel lock release member is away from the light emitting device by a prescribed distance.

In one embodiment of the invention, the section includes a cover plate having an opening.

In one embodiment of the invention, the section includes a first cover plate including the reel lock release member and a second cover plate including the light emitting device.

According to another aspect of the invention, a method for assembling a magnetic recording and reproduction apparatus includes the step of providing a sub chassis unit on which a cassette, including a magnetic tape, a first reel, a second reel, and a reel lock member for locking the first reel and the second reel, is mountable, the sub chassis unit including a first reel stand engageable with the first reel in the state where the cassette is mounted on the sub chassis unit, a second reel stand engageable with the second reel in the state where the cassette is mounted on the sub chassis unit, a reel lock releasing member for unlocking the reel lock member of the cassette in the state where the cassette is mounted on the sub chassis unit, and a light emitting device for emitting light for detecting a leading end and a trailing end of the magnetic tape in the state where the cassette is mounted on the sub chassis unit; providing a main chassis unit, the main chassis unit including a rotatable head cylinder used for recording information to, and/or reproducing information from, the magnetic tape; combining the sub chassis unit and the main chassis unit; and mounting an idler for driving the first reel stand and the second reel stand of the sub chassis unit on the main chassis unit after the sub chassis unit and the main chassis unit are combined.

In one embodiment of the invention, the method further includes the step of moving the sub chassis unit to move relative to the main chassis unit between a first position where information is recordable to, and/or information is reproduceable from, the magnetic tape, and a second position where the cassette is mountable on the sub chassis unit. The step of mounting the idler on the main chassis unit includes the step of mounting the idler between when the sub chassis unit is at the first position and when the sub chassis unit is at the second position.

According to the present invention, a sub chassis unit including a reel lock release member and a light emitting device is prepared in advance. After the sub chassis unit and a main chassis unit are combined, an idler for driving the first reel stand and the second reel stand of the sub chassis unit can be mounted on the main chassis unit.

Since the sub chassis unit including the reel lock release member and the light emitting device can be prepared before the sub chassis unit and the main chassis unit are combined, the magnetic recording and reproduction apparatus can be assembled more easily, as compared to the prior art by which the reel lock release member and the light emitting device can be attached only after the idler is mounted on the main chassis unit. In addition, the present invention can reduce the number of components used for assembling the magnetic recording and reproduction apparatus, which makes it easier to manage the components.

According to the present invention, the sub chassis unit is treated as a large unit including the reel lock release member and the light emitting device for detecting a leading end and a trailing end of the tape. Therefore, a magnetic recording and reproduction apparatus according to the present invention is produced at low cost, provides high quality, and is easily disassembled and assembled for maintenance or the like.

According to the present invention, the sub chassis unit is treated as a large unit including a cover plate including the reel lock release member and the light emitting device for detecting a leading end and a trailing end of the tape. Therefore, a magnetic recording and reproduction apparatus according to the present invention is produced at low cost, provides high quality, and is easily disassembled and assembled for maintenance or the like.

According to the present invention, the sub chassis, unit is treated as a large unit including a first cover plate including the reel lock release member and the second cover plate including the light emitting device for detecting a leading end and a trailing end of the tape. Therefore, a magnetic recording and reproduction apparatus according to the present invention is produced at low cost, provides high quality, and is easily disassembled and assembled for maintenance or the like.

Thus, the invention described herein makes possible the advantages of providing a low-cost, high-quality magnetic recording and reproduction apparatus which is easily assembled and disassembled, and a method for assembling such a magnetic recording and reproduction apparatus.

These and other advantages of the present invention will become apparent to those skilled in the art upon reading and understanding the following detailed description with reference to the accompanying figures.

BRIEF DESCRIPTION OF THE DRAWINGS

FIGS. 13A through 13F are plan views illustrating the positional relationship between a sub chassis driving pin and a sub chassis adjusting plate for driving the sub chassis of the magnetic recording and reproduction apparatus according to the present invention;

DESCRIPTION OF THE PREFERRED EMBODIMENTS

Hereinafter, the present invention will be described by way of illustrative examples with reference to FIGS. 1 through 17.

A magnetic recording and reproduction apparatus according to the present invention includes a main chassis and a sub chassis. Namely, the magnetic recording and reproduction apparatus according to the present invention has a two-chassis structure.

A magnetic recording and reproduction apparatus according to the present invention includes a sub chassis unit including a sub chassis, a main chassis unit including a main chassis, and an idler. The magnetic recording and reproduction apparatus according to the present invention is produced by assembling the sub chassis unit, the main chassis unit, and the idler.

The magnetic recording and reproduction apparatus according to the present invention records information to, and/or reproduces information from, a magnetic tape included in a cassette mounted thereon.

Hereinafter, a magnetic recording and reproduction apparatus 100 according to the present invention will be described with reference to FIGS. 1 through 17.

First, the sub chassis unit will be described.

Figure 1:
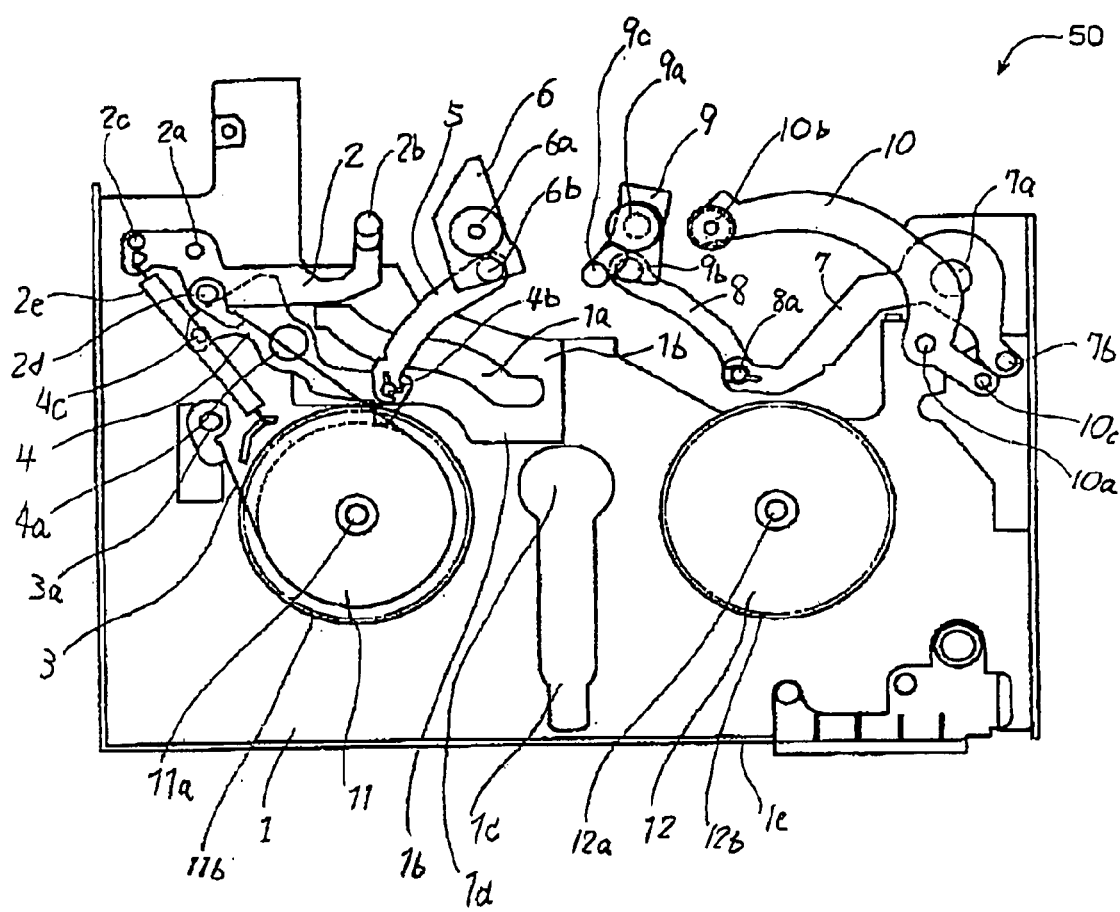
FIG. 1 is a plan view of a sub chassis of a magnetic recording and reproduction apparatus in one example according to the present invention.

FIG. 1 is a plan view of a sub chassis unit 50 of the magnetic recording and reproduction apparatus 100 according to the present invention.

The sub chassis unit 50 includes a sub chassis 1, four tape pull-out members 2, 6, 9 and 10 provided on the sub chassis 1, a supply reel stand (hereinafter, referred to also as an "S reel stand") 11 rotatably supported on the sub chassis 1, and a take-in reel stand (hereinafter, referred to also as a "T reel stand") 12 rotatably supported on the sub chassis 1. The four tape pull-out members 2, 6, 9 and 10 will also be referred to as a TR arm 2, an S boat 6, a T boat 9, and a T3 arm 10.

A cassette (not shown) is mountable on the sub chassis unit 50. The cassette is mounted from a forward end 1e of the sub chassis 1. The cassette has a general structure including a magnetic tape, a supply reel, a take-in reel, and a reel lock member for locking the supply reel and the take-in reel.

The S reel stand 11 is engageable with the supply, reel of the cassette, and the T reel stand 12 is engageable with the take-in reel of the cassette.

The TR arm 2 is pivotably supported about a support 2a on the sub chassis 1. A TR post 2b is provided on a top surface of one end of the TR arm 2, and a TR arm driving pin 2a is provided on a bottom surface of other end of the TR arm 2.

The T3 arm 10 is pivotably supported about a support 10a on the sub chassis 1. A T3 post 10b is provided on a top surface of one end of the T3 arm 10, and a T3 arm driving pin 10c is provided on a bottom surface of other end of the T3 arm 10.

An S arm 4 is pivotably supported about a support 4a on the sub chassis 1. An S arm driving pin 4c is provided on a bottom surface of one end of the S arm 4, and an S link pin 4b is provided on a top surface of the other end of the S arm 4.

An S link 5 is pivotably attached to the S link pin 4b at one end of the S link 5. The S boat 6 is pivotably attached to the other end of the S link 5 via a boss 6b.

A T arm 7 has substantially the same structure as that of the S arm 4. Specifically, the T arm 7 is supported to be pivotable about a support 7a on the sub chassis 1.

A T arm driving pin 7b is provided on a bottom surface of one end of the T arm 7, and a T link pin 8a is provided on a top surface of the other end of the T arm 7.

A T link 8 is pivotably attached to the T link pin 8a at one end of the T link 8. The T boat 9 is pivotably attached to the other end of the T link 8 via a boss 9b.

The S boat 6 has an S roller post 6a provided thereon for guiding the magnetic tape, and the T boat 9 has a T roller post 9a and a T1 post 9a provided thereon for guiding the magnetic tape.

As described above, all the tape pull-out members 2, 6, 9 and 10 are provided on the sub chassis 1.

The S reel stand 11 and the T reel stand 12 are supported so as to be rotatable about a shaft 11a and a shaft 12a, respectively. A gear portion 11b is provided around an outer circumference of the S reel stand 11, and a gear portion 12b is provided around an outer circumference of the T reel stand 12. The S reel stand 11 is engaged with a Supply reel of the cassette (not shown) and the T reel stand 12 is engaged with a take-in reel of the cassette (not shown) when the cassette is mounted on the sub chassis 1. This engagement allows the magnetic tape to be taken in.

A brake band (TR band) 3 for controlling the tension of the magnetic tape while the magnetic tape is running is wound around the S reel stand 11. One end of the TR band 3 is supported about a pivotable member 2d of the TR arm 2, and the other end of the TR band 3 is supported about a pivotable member 3a on the sub chassis 1. While the magnetic tape is running, a load acts on the S reel stand 11 via the TR band 3 by a force of a TR spring 2e attached to the TR arm 2.

In a sub chassis adjusting plate 1b, a groove 1a is; formed. The sub chassis adjusting plate 1b is secured to the sub chassis 1 by a screw (not shown). The sub chassis 1 has a lengthy hole 1c and a circular hole 1d communicated with the lengthy hole 1c at an end of the lengthy hole 1c opposite to the forward end 1e. In FIG. 1, a first cover plate 36, a second cover plate 37, and photosensors 38a and, 38b are omitted for simplicity (these elements are shown; in, for example, FIGS. 7, 8 and 9).

Figure 2:
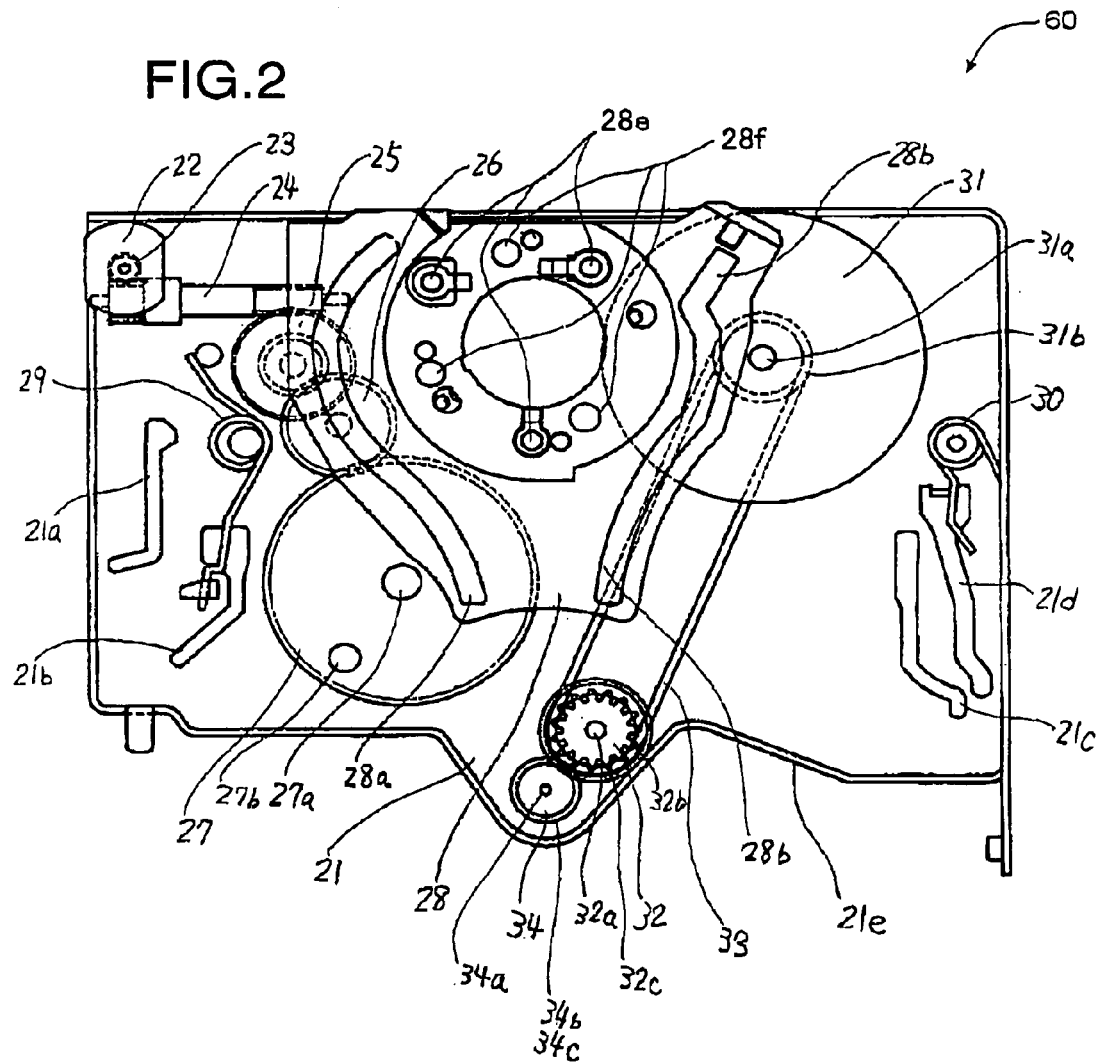
FIG. 2 is a plan view of a main chassis of the magnetic recording and reproduction apparatus according to the present invention.

Next, a structure of a main chassis unit 60 of the magnetic recording and reproduction apparatus 100 will be described with reference to FIG. 2. FIG. 2 is a plan view of the main chassis unit 60 of the magnetic recording and reproduction apparatus 100 according to the present invention.

The main chassis unit 60 includes a main chassis 21, a capstan 31 provided on the main chassis 21, a capstan shaft 31a provided on the capstan 31, a drive gear 32, a timing belt 33, and a center gear 34.

The main chassis 21 has four arm grooves 21a, 21b, 21a and 21d formed therein. A portion of the main chassis 21 along a forward end 21e is largely cut out on both sides of the drive gear 32 and the center gear 34 toward a rotation head cylinder 41 (not shown in FIG. 2). The forward end 21e has an L-shaped cross-section in the thickness direction of the magnetic recording and reproduction apparatus 100. The forward end 21e has a certain thickness.

A motor 22 is rotatable forward and backward. A rotation force of the motor 22 is conveyed to a mode gear 27 via a motor worm 23, a connection worm 24, and gears 25 and 26. The mode gear 27 is rotatable with a support 27a as the center of rotation. A sub chassis driving pin 27b is provided on a top surface of the mode gear 27. The sub chassis driving pin 27b is engaged with the sub chassis 1 (FIG. 1), so that the sub chassis 1 is movable relative to the main chassis 21.

A cylinder base 28 is secured to the main chassis 21 via three cylinder screw holes 28e. The rotatable head cylinder 41 (not shown in FIG. 2) is provided on a cylinder base 28, and is secured with three cylinder screw holes 28f which are screwed from a rear surface of the cylinder base 28.

Guide grooves 28a and 28b are respectively provided for guiding the S boat 6 and the T boat 9 mounted on the sub chassis 1 when the S boat 6 and the T boat 9 pull out the magnetic tape from the cassette. Elastic twisted coil springs 29 and 30 are secured on the main chassis 21 in the state of being provided with a pressure by a prescribed force.

The capstan shaft 31a rotates in the state where the pinch roller (not shown) presses the tape to the capstan shaft 31a, thereby driving the tape. A capstan gear 31b is integrally provided with the capstan 31.

The drive gear 32 is supported at an axis thereof by a rotation shaft 32a provided on the main chassis 21. The drive gear 32 includes an upper gear 32b and a lower gear 32c. The timing belt 33 is extended around the upper, gear 32b and the capstan gear 31b integral with the capstan 31.

Figure 10:
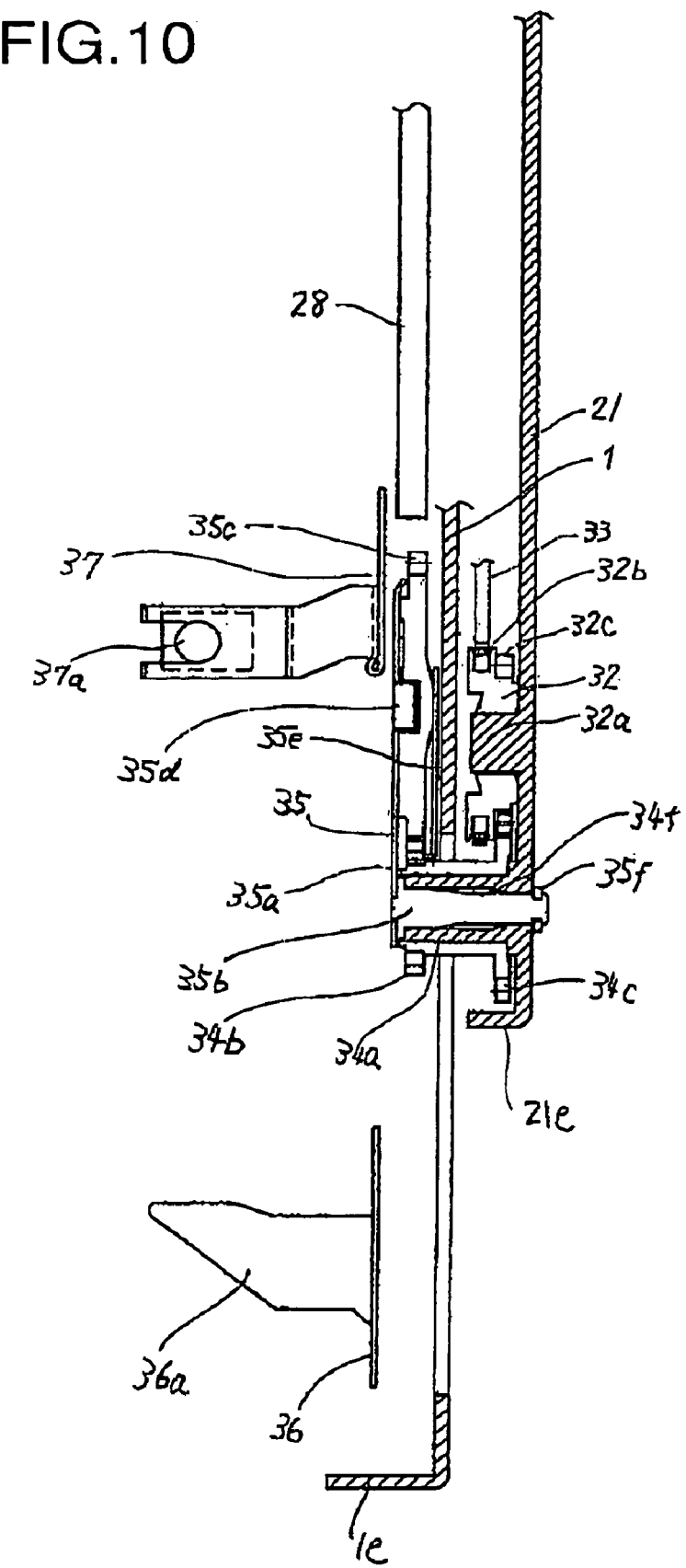
FIG. 10 is a partial cross-sectional view of the magnetic recording and reproduction apparatus according to the present invention taken along line G1 shown in FIG. 7.
Figure 11:
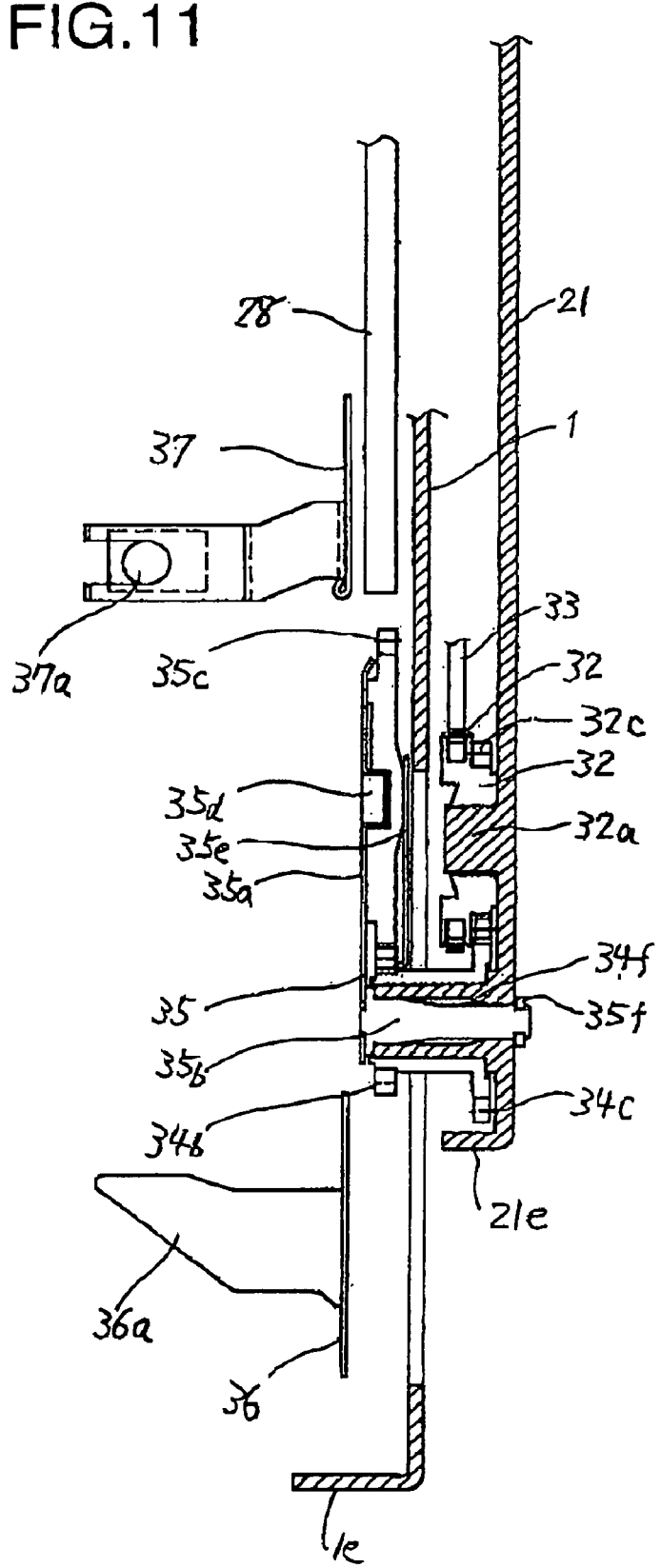
FIG. 11 is a partial cross-sectional view of the magnetic recording and reproduction apparatus according to the present invention taken along line G2 shown in FIG. 8.
Figure 12:
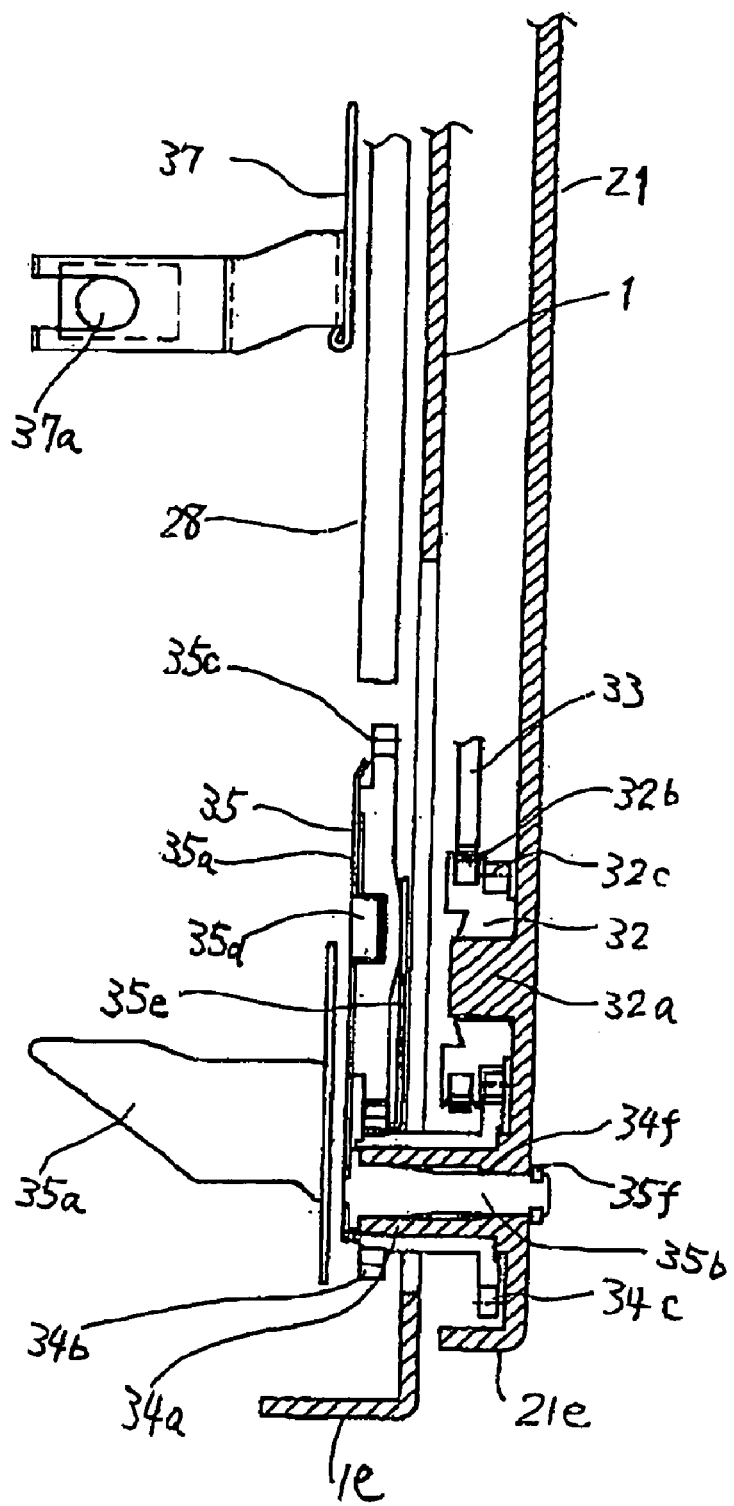
FIG. 12 is a partial cross-sectional view of the magnetic recording and reproduction apparatus according to the present invention taken along line G3 shown in FIG. 9.

The center gear 34 is supported at an axis thereof by a rotation shaft 34a provided on the main chassis 21. The center gear 34 includes an upper gear 34b and a lower gear 34c. The lower gear 32a of the drive gear 32 and the lower gear 34c of the center gear 34 are engaged with each other (FIGS. 10 through 12).

Figure 3:
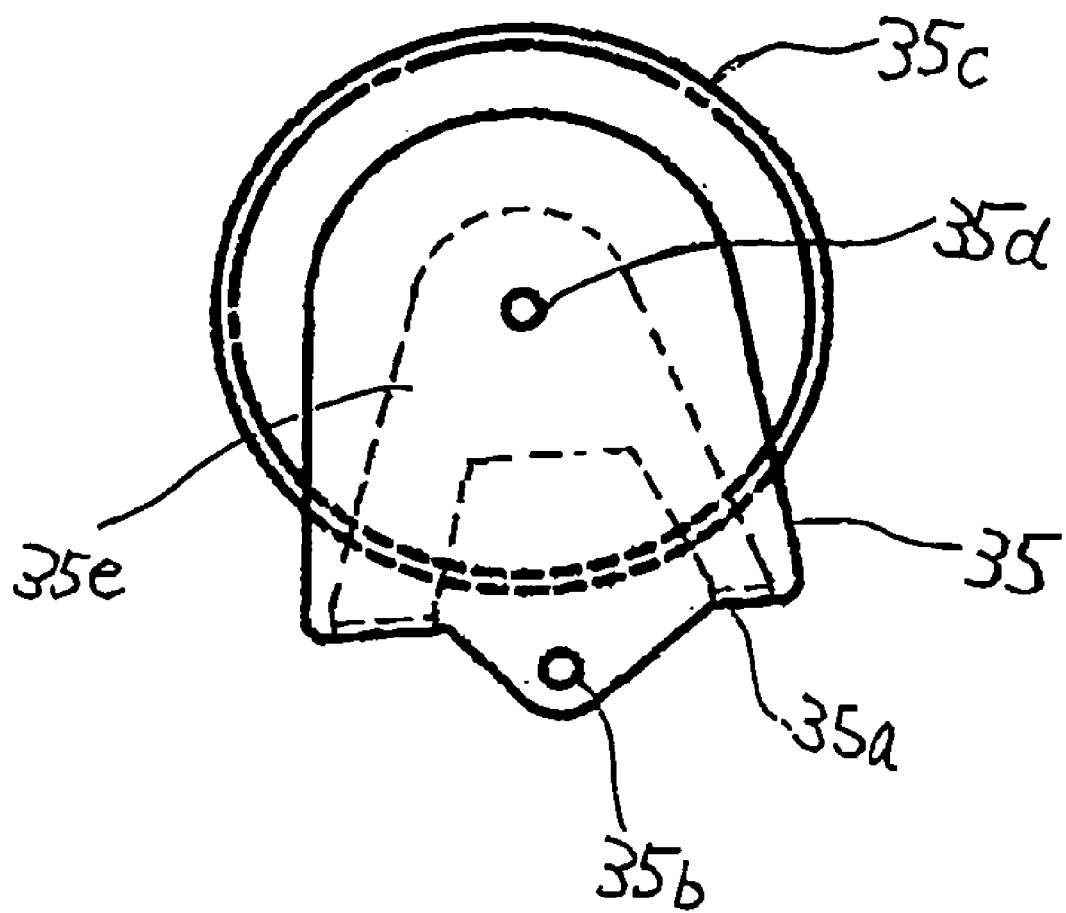
FIG. 3 is is a plan view of an idler of the magnetic recording and reproduction apparatus according to the present invention.

FIG. 3 is a plan view of an idler 35. The idler 35 includes an idler arm 35a, an idler gear 35c, and an idler gear pressing section 35e.

In the assembled state of the magnetic recording and; reproduction apparatus 100, the idler arm 35a is held on the main chassis 21 so as to be pivotable about a pivoting shaft 35b. The idler gear 35c is held on the idler arm 35a so as to be rotatable about a rotation shaft 35d. The idler gear pressing section 35e is integral with the idler arm 35a. The idler gear pressing section 35e presses the idler gear 35c to generate a rotation load torque in the idler gear 35c.

The structure and operation of the magnetic recording and reproduction apparatus 100 will be described with reference to FIGS. 4 through 12.

Figure 4:
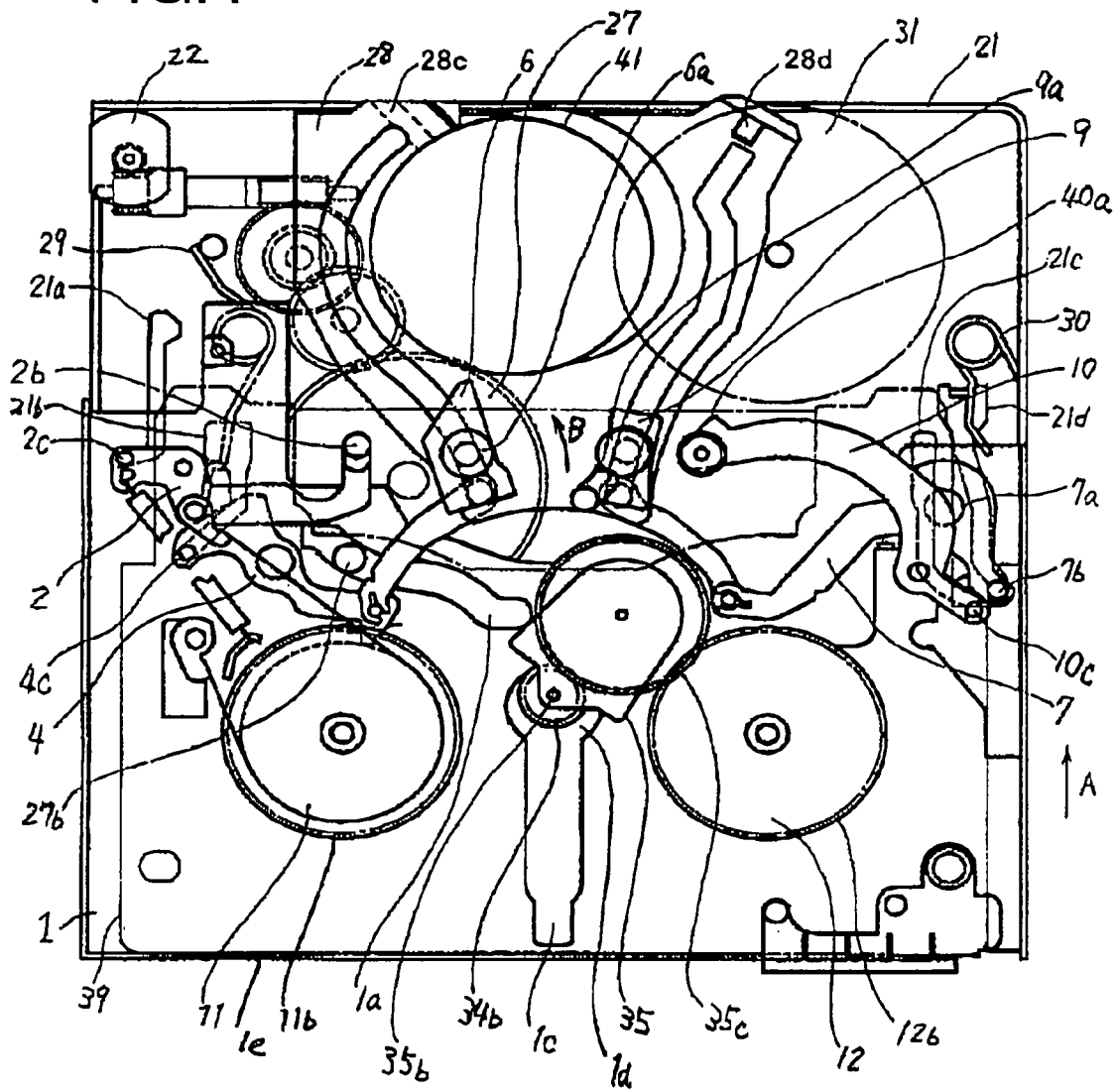
FIG. 4 is a plan view of the magnetic recording and reproduction apparatus according to the present invention in a tape cassette mountable state, from which a first cover plate and a second cover plate are omitted.
Figure 5:
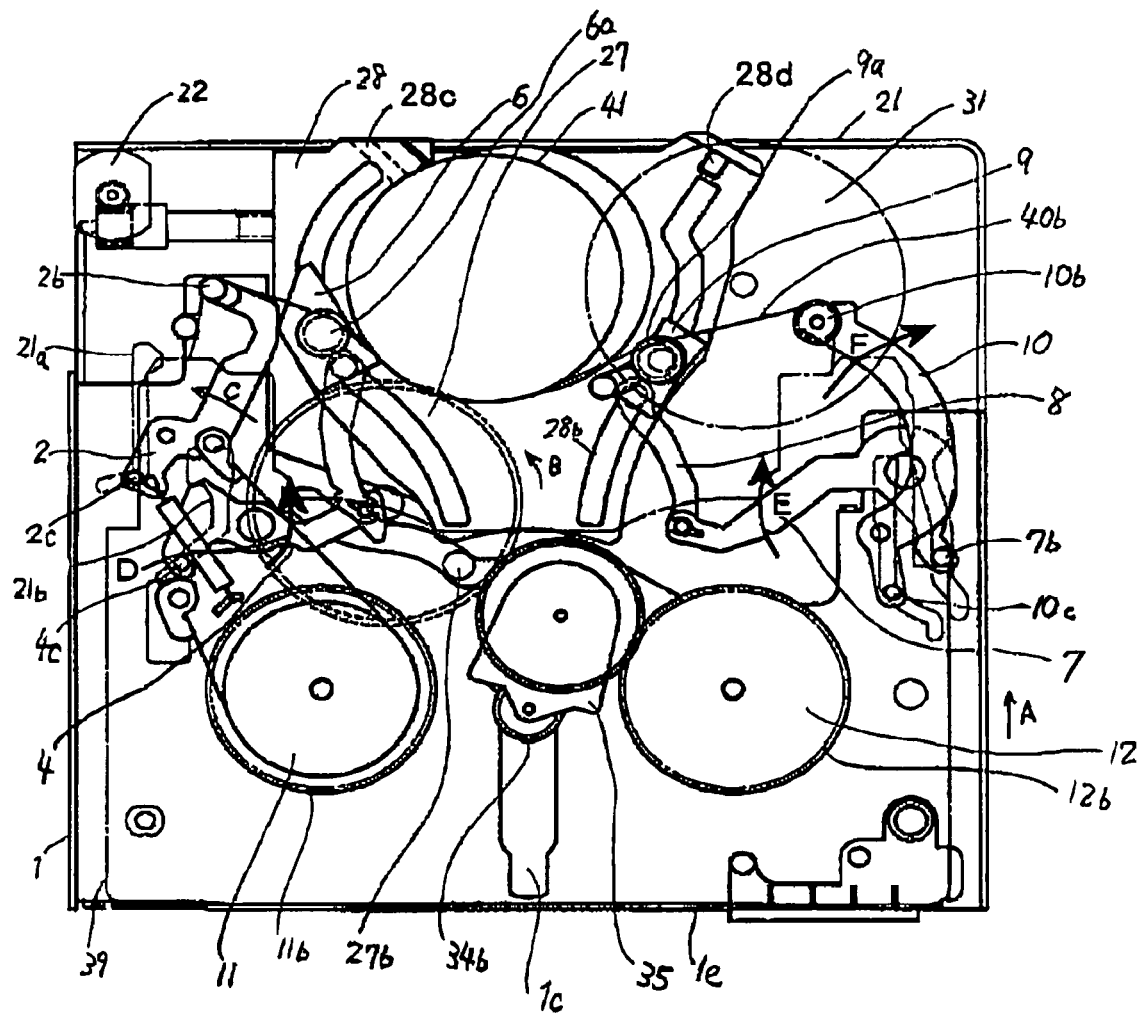
FIG. 5 is a plan view of the magnetic recording and reproduction apparatus according to the present invention in the middle of loading, from which the first cover plate and the second cover plate are omitted.
Figure 6:
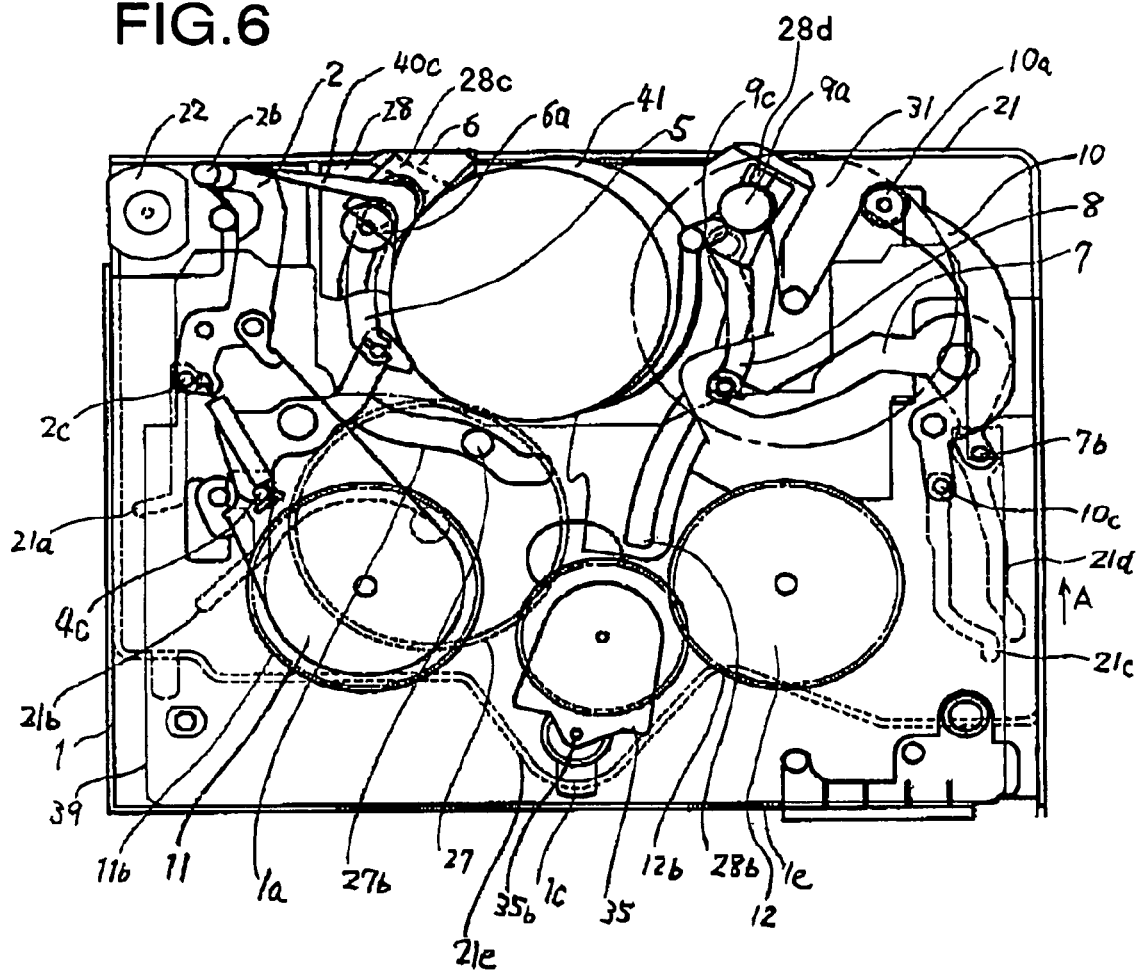
FIG. 6 is a plan view of the magnetic recording and reproduction apparatus according to the present invention in a recording and reproduction state, from which the first cover plate and the second cover plate are omitted.

FIG. 4 is a plan view of the magnetic recording and reproduction apparatus according to the present invention in a tape cassette mountable state. FIG. 5 is a plan view of the magnetic recording and reproduction apparatus in the middle of loading. FIG. 6 is a plan view of the magnetic recording and reproduction apparatus in a recording and reproduction state. In FIGS. 4, 5 and 6, the first cover plate 36, the second cover plate 37, and the photosensors 38a and 38b are omitted for simplicity (these elements are shown in, for example, FIGS. 7, 8 and 9).

Figure 7:
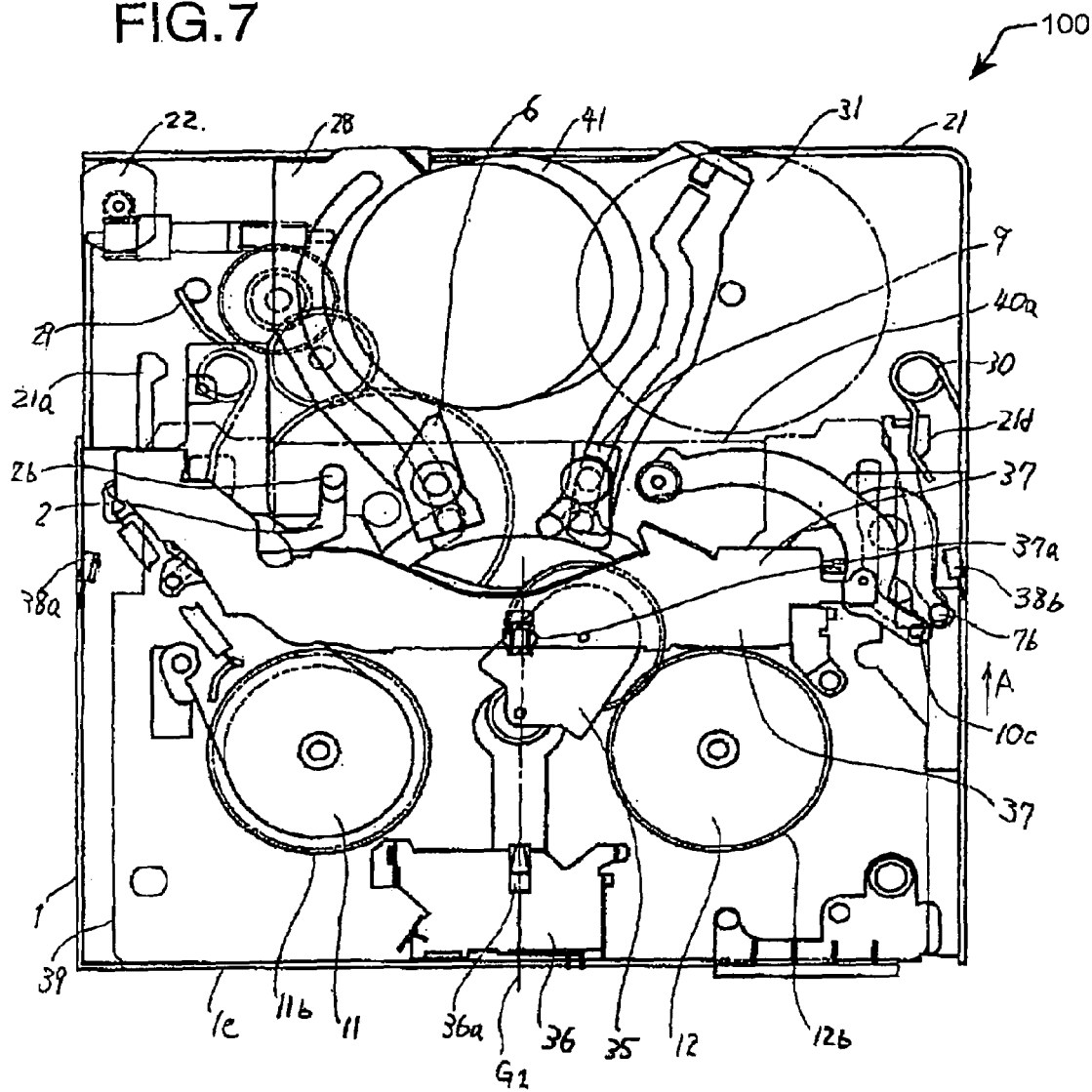
FIG. 7 is a plan view of the magnetic recording and reproduction apparatus according to the present invention in the tape cassette mountable state.
Figure 8:
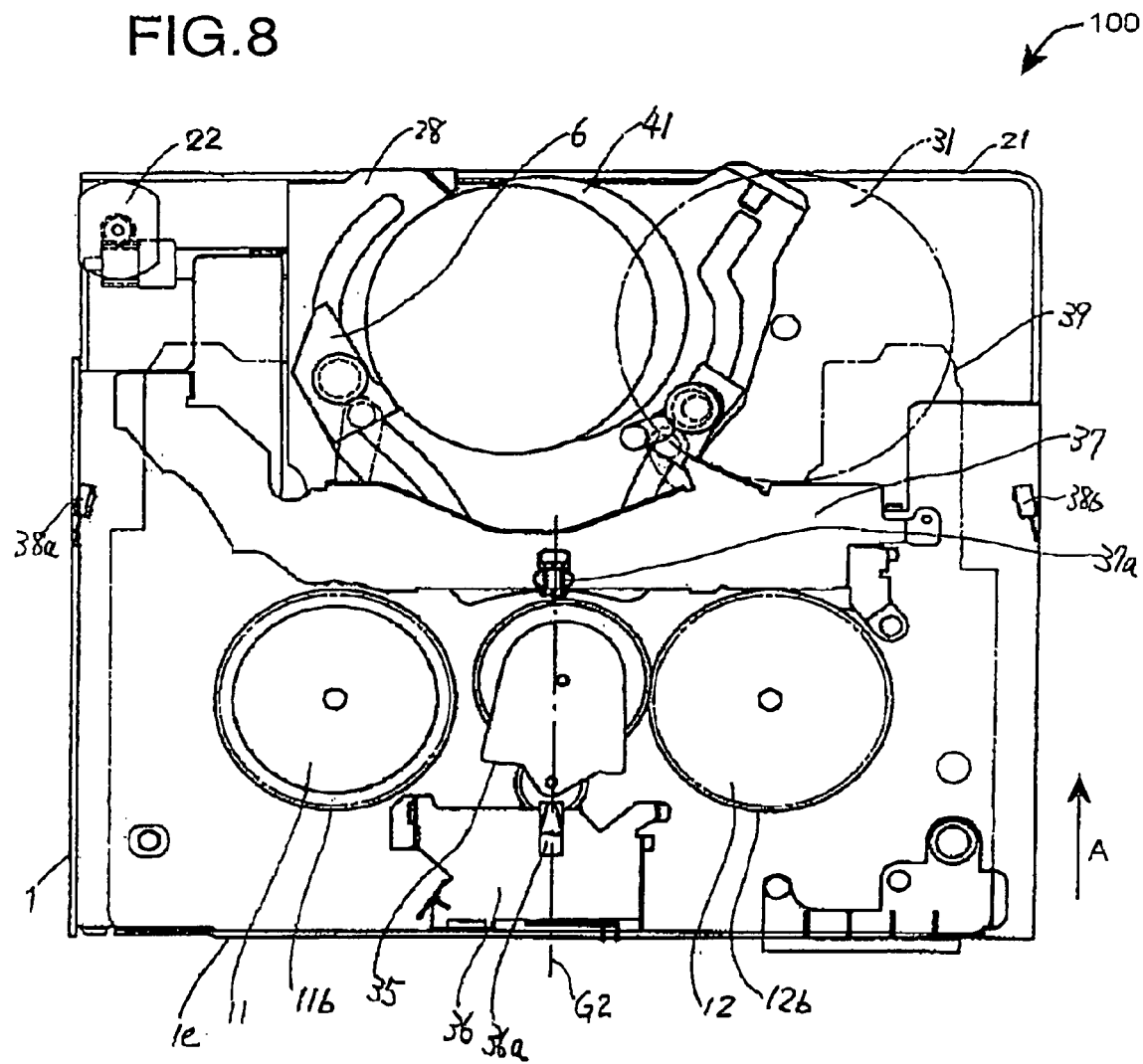
FIG. 8 is a plan view of the magnetic recording and reproduction apparatus according to the present invention in the middle of loading.
Figure 9:
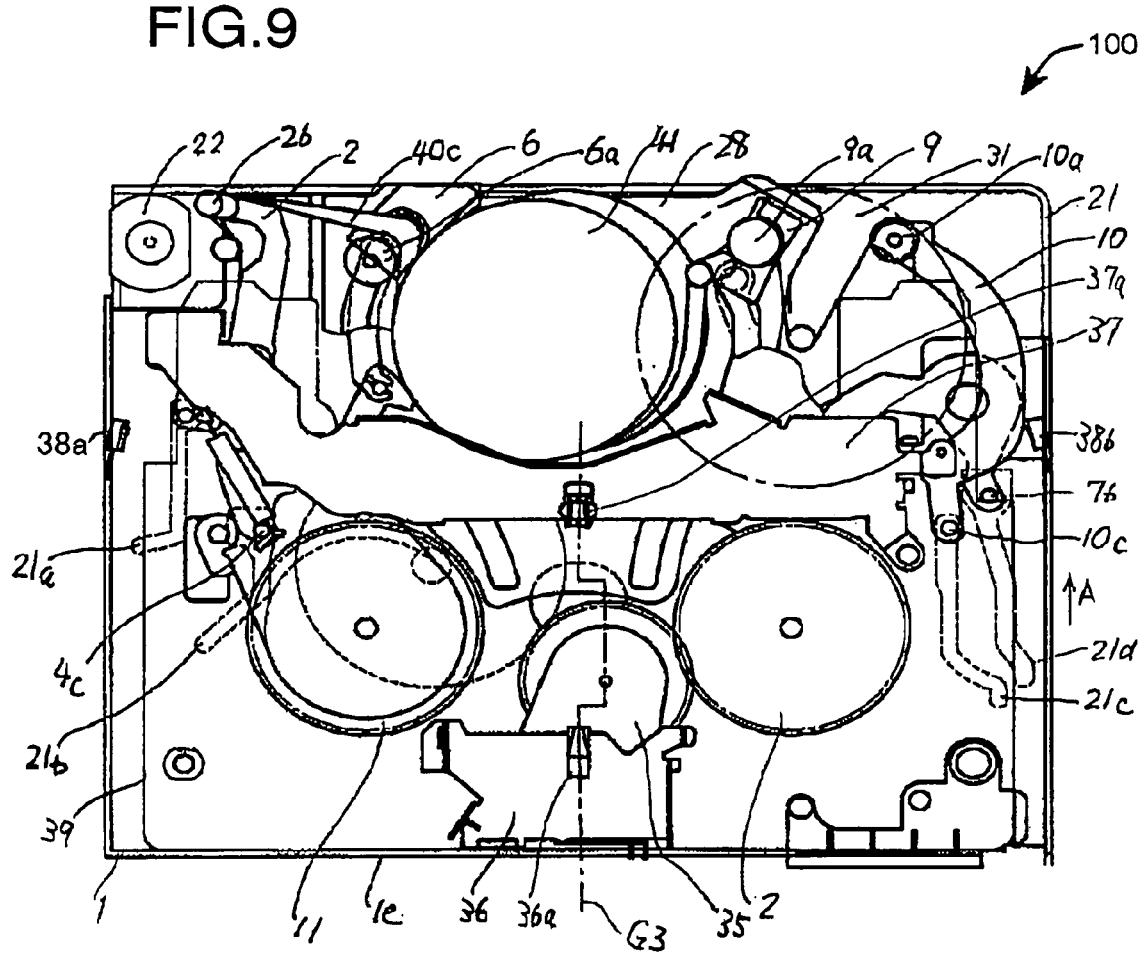
FIG. 9 is a plan view of the magnetic recording and reproduction apparatus according to the present invention in the recording and reproduction state.

FIG. 7 is a plan view of the magnetic recording and reproduction apparatus according to the present invention in the tape cassette mountable state. FIG. 8 is a plan view of the magnetic recording and reproduction apparatus in the middle of loading. FIG. 9 is a plan view of the magnetic recording and reproduction apparatus in the recording and reproduction state. In FIG. 8, some of the components of the sub chassis unit 50 and some of the components of the main chassis unit 60 are omitted for simplicity.

In FIGS. 4, 5, 6, 7, 8 and 9, the components of the cassette 39 except for a tape 40 are omitted for simplicity. The tape 40 is a magnetic tape. The tape 40 is represented by reference numeral 40a in the tape cassette mountable state, by reference numeral 40b in the middle of loading, and by reference numeral 40c in the cassette recording and reproduction state.

FIG. 10 is a partial cross-sectional view of the magnetic recording and reproduction apparatus 100 taken along line G1 shown in FIG. 7. FIG. 11 is a partial cross-sectional view of the magnetic recording and reproduction apparatus 100 taken along line G2 shown in FIG. 8. FIG. 12 is a partial cross-sectional view of the magnetic recording and reproduction apparatus 100 taken along line G3 shown in FIG. 9.

In FIGS. 4, 5, 6, 7, 8, 9, 10, 11 and 12, the drive gear 32 is supported at the axis thereof by the rotation shaft 32a provided on the main chassis 21 as described above. The drive gear 32 includes the upper gear 32b and the lower gear 32c.

The timing belt 33 is extended around the upper gear 32b of the drive gear 32 and the capstan gear 31b. The center gear 34 is supported at the axis thereof by the rotation shaft 34a provided on the main chassis 21.

The center gear 34 includes the upper gear 34b and the lower gear 34b. The lower gear 32c of the drive gear 32 and the lower gear 34c of the center gear 34 are engaged with each other.

The idler 35 drives the supply reel stand 11 and the take-in reel stand 12 in the sub chassis unit 50.

The pivoting shaft 35b of the idler 35 is inserted into a boss portion 34f (FIGS. 10 through 12) of the rotation shaft 34a provided on the main chassis 21 and is held by a cut washer 35f (FIGS. 10 through 12).

The upper gear 34b of the center gear 34 is engaged with the idler gear 35c. The rotation shaft 34a provided on the main chassis 21 passes through the lengthy hole 1c in the sub chassis 1. Owing to such a structure, the rotation of the capstan shaft 31a is conveyed to the idler 35 via the timing belt 33, the drive gear 32 and the center gear 34. The idler 35 is engaged with the gear portion 11b around the S reel stand 11 or the gear portion 12b around the T reel stand 12 depending on the rotation direction of the capstan shaft 31a. Thus, the S reel stand 11 or the T reel stand 12 is rotated.

As shown in FIG. 7, the first cover plate 36 is provided on the sub chassis 1. On a top surface of the first cover plate 36, a reel lock release member 36a for releasing a reel lock mechanism (not shown; provided in a cassette 39) is provided. The reel lock release member 36a is inserted into the cassette 39 when the cassette 39 is mounted on the sub chassis unit 50 and releases the reel lock mechanism in the cassette 39.

The second cover plate 37 is also provided on the sub chassis 1. An LED 37a is provided on a top surface of the second cover plate 37. Light emitted from the LED 37a passes through the cassette 39 and then is sensed by the photosensors 38a and 38b respectively provided on two side surfaces of the sub chassis 1. Thus, a leading end and a trailing end of the tape are detected.

The reel lock release section 36a and the LED 37a are away from each other by a prescribed distance.

In the tape cassette mountable state shown in FIGS. 4 and 7, the sub chassis 1 is guided by a guide section (not shown) so as to be movable with respect to the main chassis 21 in a direction represented by arrow A. The TR arm driving pin 2c of the TR arm 2 is slidably engaged with the cam groove 21a of the main chassis 21. The T3 arm driving pin 10c of the T3 arm 10 is slidably engaged with the cam groove 21c of the main chassis 21. The S arm driving pin 4c of the S arm 4 is engaged with the cam groove 21b of the main chassis 21. The T arm driving pin 7b of the T arm 7 is engaged with the cam groove 21d of the main chassis 21.

The sub chassis driving pin 27b on the mode gear 27 on the main chassis 21 is engaged with the groove 1a of the sub chassis adjusting plate 1b (FIG. 1).

As described above, in FIG. 4, the magnetic recording and reproduction apparatus is in the tape cassette mountable state in which the cassette 39 can be mounted on the sub chassis 1 or taken out from the sub chassis 1. In this state, the posts 2b, 6a, 9a and 10b of the tape pull-out members 2, 6, 9 and 10 are all inside the perimeter of the magnetic tape 40a, i.e., in the opening of the cassette 39. When the motor 22 rotates In this state, the mode gear 27 pivots in a direction represented by arrow B. As a result, the sub chassis driving pin 27b also moves in the direction of arrow B. As a result, the sub chassis driving pin 27b moves in the groove 1a of the sub chassis adjusting plate 1b, which moves the sub chassis 1 in the direction of arrow A.

With reference to FIGS. 13A through 13F, an operation of the sub chassis 1 driven by the mode gear 27, i.e., the sub chassis adjusting plate 1b secured to the sub chassis 1 will be described.

FIGS. 13A through 13F are plan views illustrating the positional relationship between the sub chassis driving pin 27b and the sub chassis adjusting plate 1b for driving the sub chassis 1.

The groove 1a in the sub chassis adjusting plate 1b includes a first arc portion L, an arc portion M continuous with the arc portion L, and a straight portion N continuous with the arc portion M. The arc portion L and the arc portion M are projected in opposite directions from each other.

In FIG. 13A, the sub chassis driving pin 27b is at a tape cassette take-out position 27b1 (the same position as in FIGS. 4, 7 and 10).

In FIG. 13B, the sub chassis driving pin 27b is at a tape cassette insert able position 27b2. The sub chassis driving pin 27b, which is at the position 27b1 in FIG. 13A, has been moved in the arc portion L and is located at the position 27b2 in FIG. 13B. The shape of the arc portion L is the same as the shape of an arc having the center thereof at the support 27a, about which the mode gear 27 is rotatable. The arc portion L is concentric with an arc drawn by the movement of the sub chassis driving pin 27b about the center of the mode gear 27. More specifically, the radius of the arc portion L is the same as the radius of an arc drawn by the center of the sub chassis driving pin 27b when the sub chassis driving pin 27b moves about the center of the mode gear 27. Therefore, the sub chassis adjusting plate 1b does not move in the direction of arrow A. The sub chassis adjusting plate 1b does not move since the sub chassis 1 needs to be paused between when the sub chassis driving pin 27b is at the tape cassette take-out position and when the sub chassis driving pin 27b is at the tape cassette insertable position.

When the mode gear 27 further rotates in the direction of arrow B, the sub chassis driving pin 27b moves to a position 27b3 in the arc portion X as shown in FIG. 13C. In the state of FIG. 13C, the tape is being pulled out from the cassette.

Since the arc portion M is not concentric with an arc drawn by the movement of the sub chassis driving pin 27b about the center of the mode gear 27, the sub chassis adjusting plate 1b is pushed by the sub chassis driving pin 27b so as to move in the direction of arrow A. This means that the sub chassis 1 (not shown in FIGS. 13A through 13F) also moves in the direction of arrow A.

When the mode gear 27 further rotates in the direction of arrow B, the sub chassis driving pin 27b reaches a position 27b4, where the sub chassis driving pin 27b is in engagement with the straight portion N, as shown in FIG. 13D. The sub chassis 1 continuously moves in the direction of arrow A. In the state of FIG. 13D, the tape is still being pulled out from the cassette.

When the mode gear 27 further rotates in the direction of arrow B, the sub chassis driving pin 27b reaches a position 27b5 in the arc portion M as shown in FIG. 13E. In this state, the arc portion M is concentric with an arc drawn by the movement of the sub chassis driving pin 27b about the center of the mode gear 27. More specifically, the radius of the arc portion M is the same as the radius of an arc drawn by the center of the sub chassis driving pin 27b when the sub chassis driving pin 27b moves about the center of the mode gear 27. Therefore, the sub chassis adjusting plate 1b is in a pause without moving in the direction of arrow A.

In the state of FIG. 13E, the sub chassis driving pin 27b is at the position 27b5 (the same position as in FIGS. 6, 9 and 12). In this state, the tape has been completely pulled out, and the sub chassis 1 is at the utmost position (a tape pull-out completion position). The sub chassis 1 cannot move any further from this state in the direction of arrow A. The mode gear 27 further rotates in the direction of arrow B in order to obtain a play mode in which the magnetic tape can run.

Since the sub chassis driving pin 27b is in the arc portion M which is concentric with an arc drawn by the movement of the sub chassis driving pin 27b about the center of the; mode gear 27, the sub chassis adjusting plate 1b does not move in the direction of arrow A. After that, the sub chassis driving pin 27b reaches a play position 27b6 as shown in FIG. 13F. The position 27b5 is also referred to as a tape running position. The play position is a position at which information recording or reproduction is possible.

When the mode gear 27 pivots in the opposite direction from the direction of arrow B, the above-mentioned components also move in the opposite directions form those described above and the sub chassis adjusting plate 1b moves in the opposite direction from the direction of arrow A.

In FIGS. 6, 9, 12, 13E and 13F, the tape is wound around the rotatable head cylinder 41 over a prescribed angle, and thus the tape running system has been completed (i.e., the magnetic recording and reproduction apparatus is ready, to run the tape).

As described above, in a simple structure where the sub chassis driving pin 27b is provided on the mode gear, 27 which is rotatable, the sub chassis 1 can be stopped during a prescribed period and subsequently start moving, with the groove 1a of the sub chassis adjusting plate 1b being specifically shaped. Since the width of the groove 1a can be substantially the same as the diameter of the sub chassis driving pin 27b, the sub chassis 1 can be stably driven with no need to provide any extra gap between the groove 1a and the sub chassis driving pin 27b.

With reference to FIGS. 4 through 6, 7 through 9 and 10 through 12, an operation of pulling out the magnetic tape from the cassette by relative movement of the sub chassis 1 with respect to the main chassis 21 will be described.

FIG. 5 shows a state of the magnetic recording and reproduction apparatus 100 where the sub chassis 1 slightly moves in the direction of arrow A from the state shown in FIG. 4. In FIG. 5, the sub chassis driving pin 27b and the groove 1a of the sub chassis adjusting plate 1b have the positional relationship shown in FIG. 13C. The sub chassis driving pin 27b reaches the position 27b3 shown in FIG. 13C by the rotation of the mode gear 27 in the direction of arrow B.

In FIG. 5, as described above, the driving pins 2c, 4c, 7b and 10c of the elements 2, 4, 7 and 10 are respectively in engagement with the cam grooves 21a, 21b, 21d and 21c of the main chassis 21. Owing to such engagements, the elements 2, 4, 7 and 10 respectively pivot in directions represented by arrows C, D, E and F to move to the positions shown in FIG. 5. The S boat 6 and the T boat 9 are respectively guided by the guide grooves 28a and 28b of the cylinder base 28 to move to the positions shown in FIG. 5. As a result, the magnetic tape is pulled out to the position as represented by reference numeral 40b.

FIGS. 6, 9 and 12 show a state of the magnetic recording and reproduction apparatus 100, In which information recording to, or information reproduction from, the magnetic tape (represented by reference numeral 40c) is possible. The sub chassis 1 is at the tape pull-out completion position. This state is obtained from the state in FIG. 5 as a result of the mode gear 27 further moving in the direction of arrow B, the sub chassis 1 further moving in the direction of arrow A, and the tape 40b being wound around a rotatable head cylinder 41 provided on the cylinder base 28 on the main chassis 21. In FIGS. 6, 9 and 12, the sub chassis driving pin 27b and the groove 1a of the sub chassis adjusting plate 1b have the positional relationship shown in FIG. 13E. FIG. 13F shows a state where the mode gear 27 further rotates in the direction of arrow B, the pinch roller (not shown) presses the tape (represented by reference numeral 40c in FIG. 6) to the capstan shaft 31a, and the capstan shaft 31a rotates to drive the tape 40c (play mode). Although the mode gear 27 further rotates in the direction of arrow B from the state shown in FIG. 13E to the state shown in FIG. 13F, the sub chassis 1 does not move in direction of arrow A and stays at the position shown in FIGS. 6, 9 and 12.

In the state shown in FIGS. 6, 9 and 12, the S boat 6 acting to pull out the magnetic tape from the cassette is pressed to a positioning member 28c via the S arm 4 and the S link 5 via the twisted coil spring 29 (FIG. 2) and thus the position of the S boat 6 is determined. Similarly, the T boat 9 also acting to pull out the magnetic tape from the cassette is pressed to a positioning member 28d via the T arm 7 and the T link 8 via the twisted coil spring 30 (FIG. 2) and thus the position of the T boat 9 is determined.

With reference to FIGS. 14, and 15A through 15C, such a pressing positioning mechanism will be described.

Figure 14:
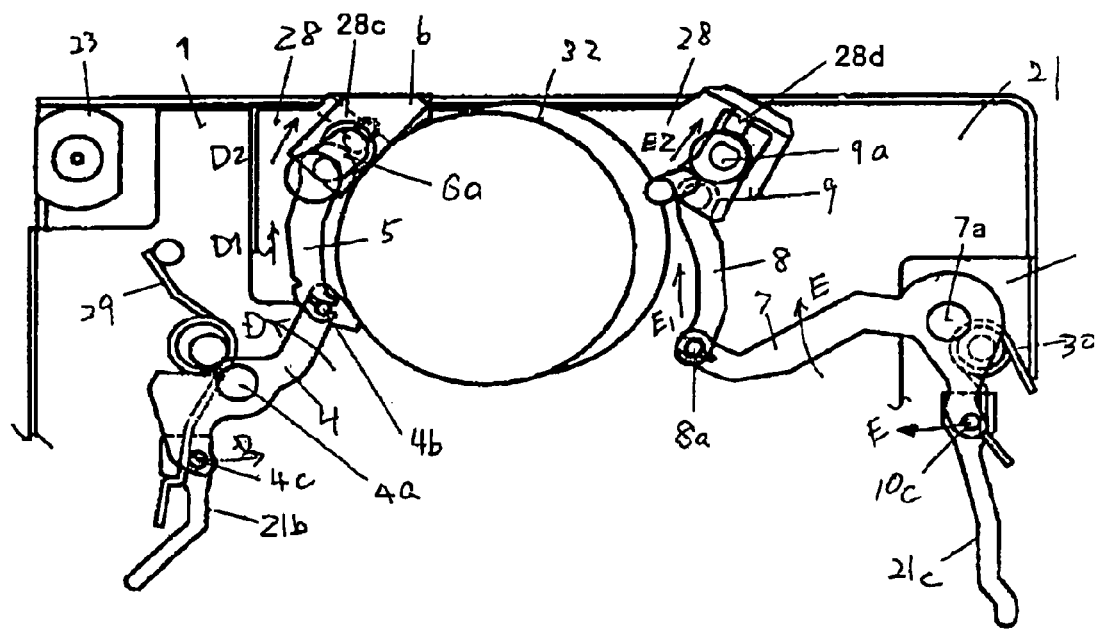
FIG. 14 is a plan view showing a positioning mechanism of the magnetic recording and reproduction apparatus according to the present invention.

FIG. 14 is a partial view of FIGS. 6 and 9. With reference to FIG. 14, a method for determining the position of the S boat 6 will be described.

The S arm 4 on the sub chassis 1 reaches the position shown in FIG. 14 by the S arm driving pin 4c being guided by the cam groove 21b in the main chassis 21. In this state, the S arm driving pin 4c is in contact with the elastic twisted coil spring 29 mounted on the main chassis 21 and thus is flexed. Accordingly, the S arm 4 is pivoted in the direction of arrow D about the support 4a by the force of the twisted coil spring 29. This force presses the S link 5 in a direction of arrow D1 and presses the S boat 6 in a direction of arrow D2. Thus, the S boat 6 is pressed to the positioning member 28c on the cylinder base 28 and thus positioned here. In this manner, the magnetic tape is completely pulled out. Similarly, the T arm 7 is pivoted in the direction of arrow E about the support 7a by the force of the twisted coil spring 30. This force presses the T link 8 in a direction of arrow E1 and presses the T boat 9 in a direction of arrow E2. Thus, the T boat 9 is pressed to the positioning member 28d on the cylinder base 28 and thus positioned here. In this manner, the magnetic tape is completely pulled out. As described above, a pressing mechanism for the S boat 6 and the T boat 9 can be realized simply by elastic coil springs secured to the main chassis 21. A positioning mechanism for each boat can be realized by quite a simple structure. This contributes to the reduction of the number of components, size reduction and improvement in the quality of the tape pull-out mechanism.

Figure 15A:
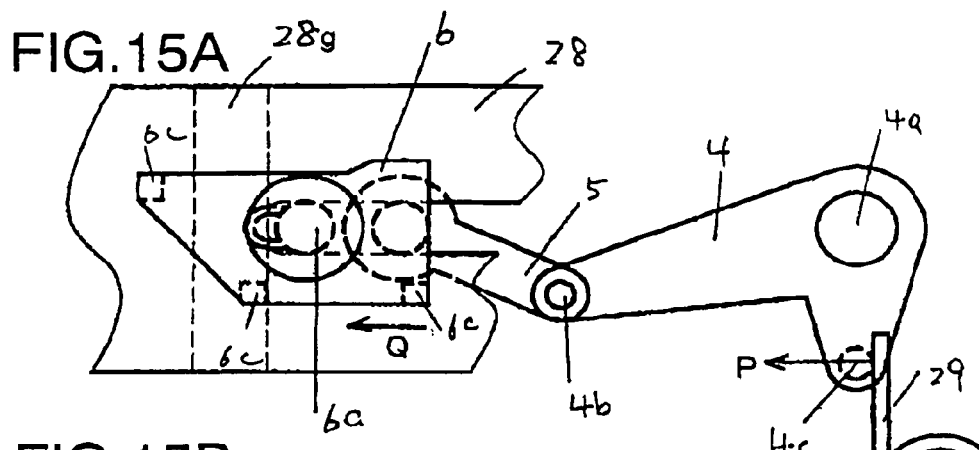
FIG. 15A is a plan view of the positioning mechanism, shown in FIG. 14.
Figure 15B:
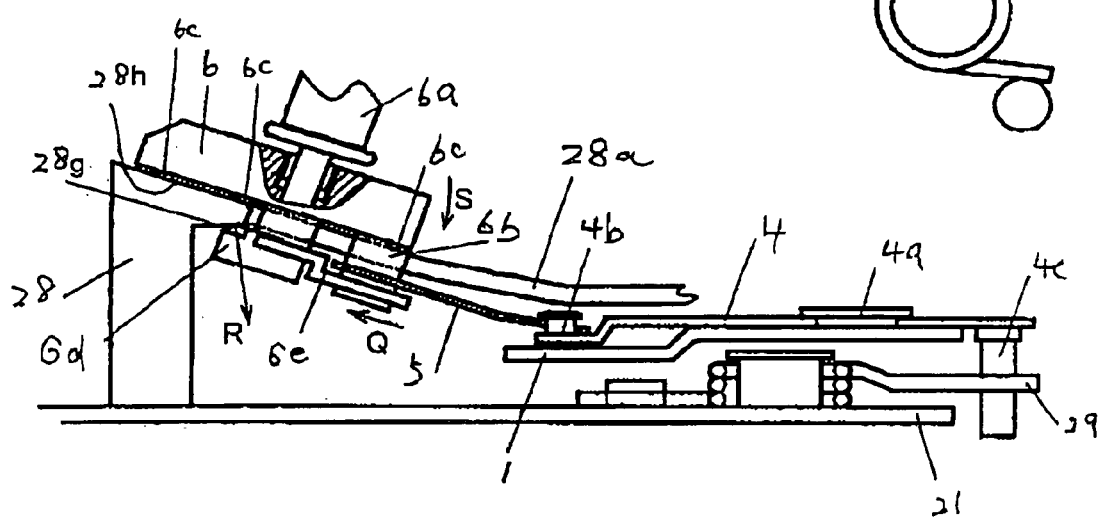
FIG. 15B is a side view thereof.
Figure 15C:
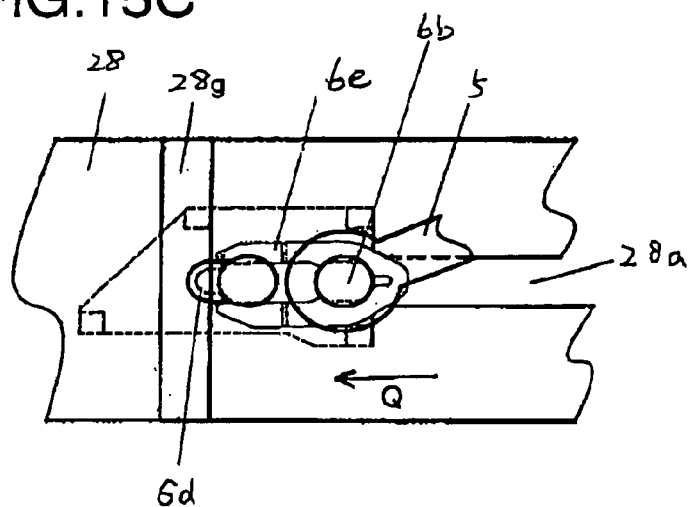
FIG. 15C is a bottom view thereof.

With reference to FIGS. 15A through 15C, the positioning mechanism for the S boat 6 will be described in more detail.

FIG. 15A is a plan view of the positioning mechanism for the S boat 6, FIG. 15B is a side view thereof, and FIG. 15C is a bottom view thereof. In FIGS. 15A through 15C, the elements are shown schematically.

The S arm 4 is urged by the elastic coil spring 29 in a direction represented by arrow P. Thus, a portion of the boss 6b which is below the guide groove 28a is pressed by the S link 5 (FIG. 15B). The S boat 6 includes a projection 6d having a semi-circular planar shape (FIG. 15C) integrally provided at a forward position on the bottom thereof. The cylinder base 28 has a ramp surface 28g on a bottom surface thereof in the vicinity of the rotatable head cylinder 41 (not shown in FIGS. 15A through 15C). The ramp surface 28g is provided such that a normal thereto is in a direction of arrow R.

With reference to FIGS. 15A through 15C, an operation of the positioning mechanism for the S boat 6 will be described.

The lower portion of the boss 6b engaged with the S boat 6 is pressed by the S link 5, and thus the projection 6d of the S boat 6 is pressed to the ramp surface 28g of the cylinder base 28. Accordingly, the entire S boat 6 is pressed in the direction of arrow Q while receiving a force in the direction of arrow R. Since the boss 6b is pressed in the direction of arrow Q, the S boat 6 also receives a force in a direction of arrow S. As a result, three points 6c on a bottom surface of the S boat 6 contact a top surface 28h of the cylinder base 28. The top surface 28h of the cylinder base 28 and the bottom surface of the S boat 6 are formed with high precision. By contact of the top surface 28h of the cylinder base 28 and the bottom surface of the S boat 6, the S boat 6 is positioned with respect to the cylinder base 28 with high precision. As described above, the S boat 6 can be positioned with high precision by a simple structure by integrally providing the projection 6d in the S boat 6 and providing the ramp surface 28g to the cylinder base 28. The S roller post 6a is provided on the S boat 6. The tilt of the S roller post 6a with respect to the main chassis 21 is very important for tape running.

The positioning mechanism for the T boat 9 has substantially the same structure and operates in substantially the same manner as described above regarding the S boat 6.

Figure 16:
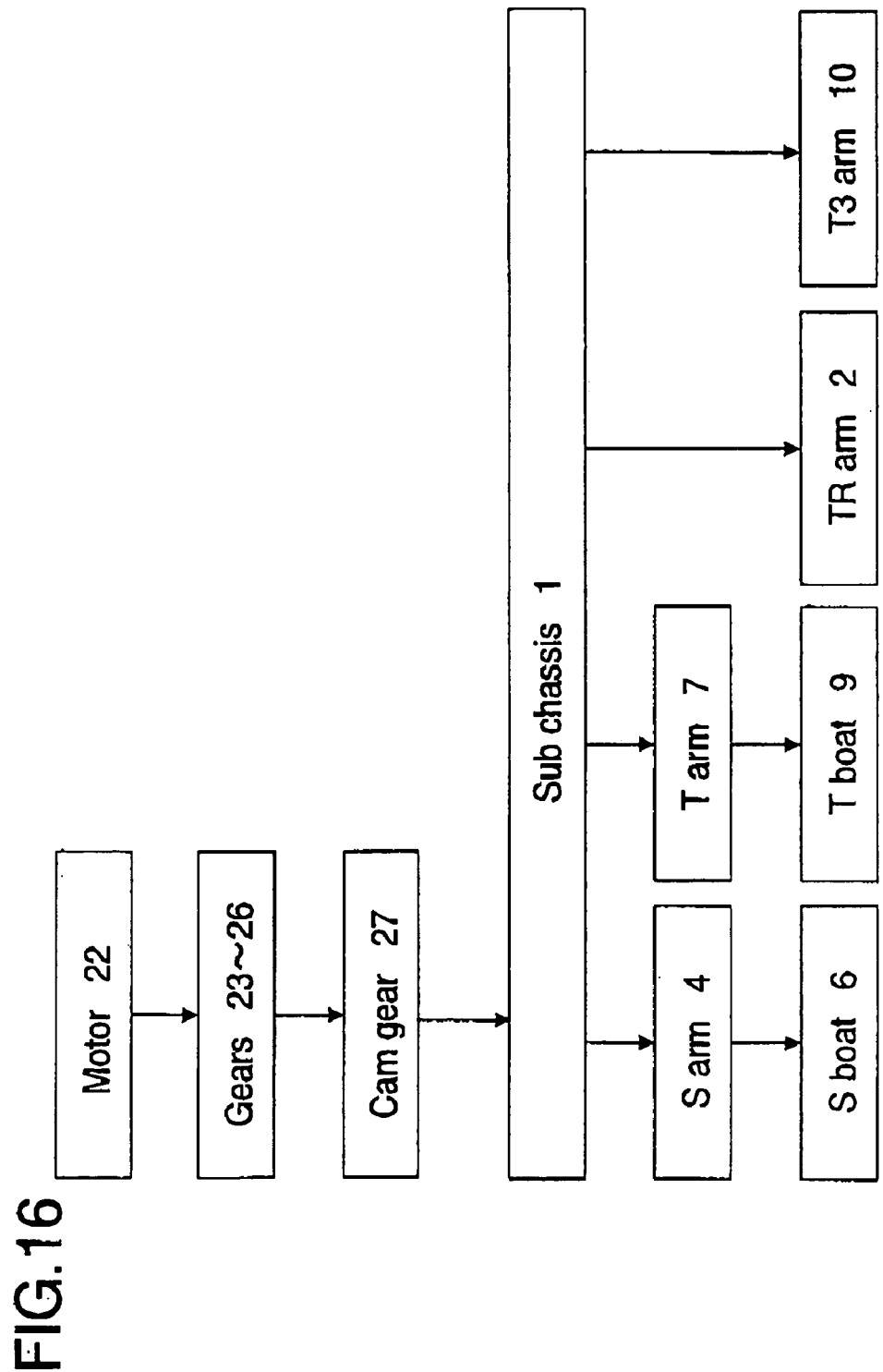
FIG. 16 shows a flow of a force for pulling out a tape from a cassette according to the present invention.

FIG. 16 shows a flow of a force for pulling out the tape from the cassette. As shown in FIG. 16, the flow of a driving force generated by the motor 22 to the sub chassis 1 is streamlined. A simple flow of force by which elements acting for pulling out a magnetic tape from the cassette are moved by the movement of the sub chassis is realized.

The magnetic recording and reproduction apparatus 100 according to the present invention is assembled by first stacking the sub chassis unit 50 (FIG. 1) on the main chassis unit 60 (FIG. 2) to combine the sub chassis unit 50 and the main chassis unit 60, and then mounting the idler 35 (FIG. 3).

As shown in FIG. 7, the sub chassis unit 50 includes the reel lock release section 36a and the LED 37a, which is a light emitting device for detecting a leading end and a trailing end of the tape. While the sub chassis unit 50 and the main chassis unit 60 are combined, the upper gear 34b of the center gear 34 is inserted through the circular hole 1d formed in the sub chassis 1. The idler 35 is inserted between the first cover plate 36 and the second cover plate 37 in the middle of loading shown in the FIGS. 8 and 11

As described above, the magnetic recording and reproduction apparatus 100 according to the present invention can perform at least one of information recording to, and information reproduction from, the tape 40, which has been pulled out from the cassette 39 including the supply reel and the take-in reel by the tape pull-out members 2, 6, 9 and 10 and has been wound around the rotatable head cylinder 41 over a prescribed angle. The magnetic recording and reproduction apparatus 100 includes the sub chassis unit 50 on which the cassette 39 is mountable, and the main chassis unit 60 including the rotatable head cylinder 41 and guiding the sub chassis 1 to reciprocally move toward and from the rotatable head cylinder 41. The sub chassis unit 50 includes the supply reel stand 11 and the take-in reel stand 12 respectively engageable with the supply reel and the take-in reel in the cassette 39. The main chassis unit 60 includes the capstan 31 for driving the tape 40. The idler 35 is pivotably supported by the main chassis unit 60. The idler 35 is driven by the rotation of the capstan shaft 31a and is engageable with one of the supply reel stand 11 and the take-in reel stand. 12 so as to drive the supply reel stand 11 and the take-in reel stand 12 to rotate. After the main chassis unit 60 and the sub chassis unit 50 are combined together, the idler 35 is mounted on the main chassis unit 60. Thus, the sub chassis unit 50 can be treated as a large unit. Therefore, the magnetic recording and reproduction apparatus 100 is produced at low cost, provides high quality, and is easily disassembled and assembled for maintenance or the like.

The sub chassis unit 50 includes the reel lock release member 36a, for unlocking the reel look mechanism for the supply reel and the take-in reel in the cassette 39, and the LED 37a, as a light emitting device for detecting a leading end and a trailing end of the tape 40. After the sub chassis unit 50 having such a structure and the main chassis unit 60 are combined, the idler 35 is provided on the main chassis unit 60. Since the sub chassis unit 50 can be treated as a large unit including the reel look release member 36a and the LED 37a, the magnetic recording and reproduction apparatus 100 is produced at low cost, provides high quality, and is easily disassembled and assembled for maintenance or the like.

The sub chassis unit 50 includes the first cover plate 36 including the real lock release member 36a and the second cover plate 37 including the LED 37a. After the sub chassis unit 50 having such a structure and the main chassis unit 60 are combined, the idler 35 is inserted between the first cover plate 36 and the second cover plate 37 so as to be pivotably supported by the main chassis 21. Since the sub chassis unit 50 can be treated as a large unit including the first cover plate 36 having the reel lock release member 36a and the second cover plate 37 having the LED 37a, the magnetic recording and reproduction apparatus 100 is produced at low cost, provides high quality, and is easily disassembled and assembled for maintenance or the like.

In the above example, as one exemplary means for allowing the idler 35 to be mounted on the main chassis unit 60 after the sub chassis unit 50 and the main chassis unit 60 are combined, the LED 37a is included in the second cover plate 37 and the reel lock release member 36a is included In the first cover plate 36. The present invention is not limited to such a structure.

In the above example, the real lock release member 36a and the LED 37a are included in different cover plates. Alternatively, the reel lock release member 36a and the LED 37a may be included in one cover plate. In such a case, the cover plate can have an opening at a central portion thereof and the idler 35 may be inserted through the opening after the main chassis unit 60 and the sub chassis unit 50 are combined.

Figure 17:
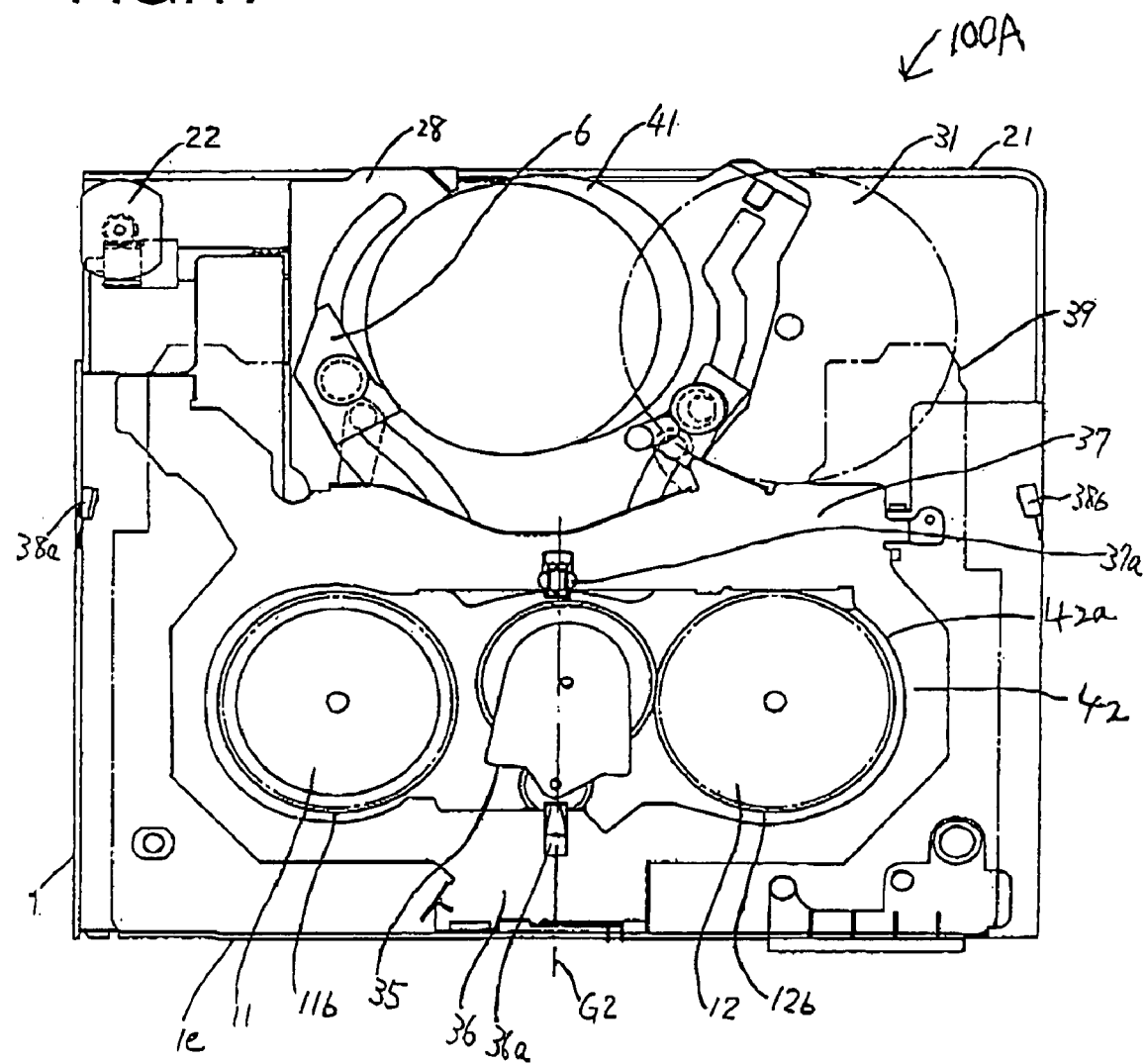
FIG. 17 is a plan view of a magnetic recording and reproduction apparatus in another example according to the present invention in the middle of loading.
Figure 18:
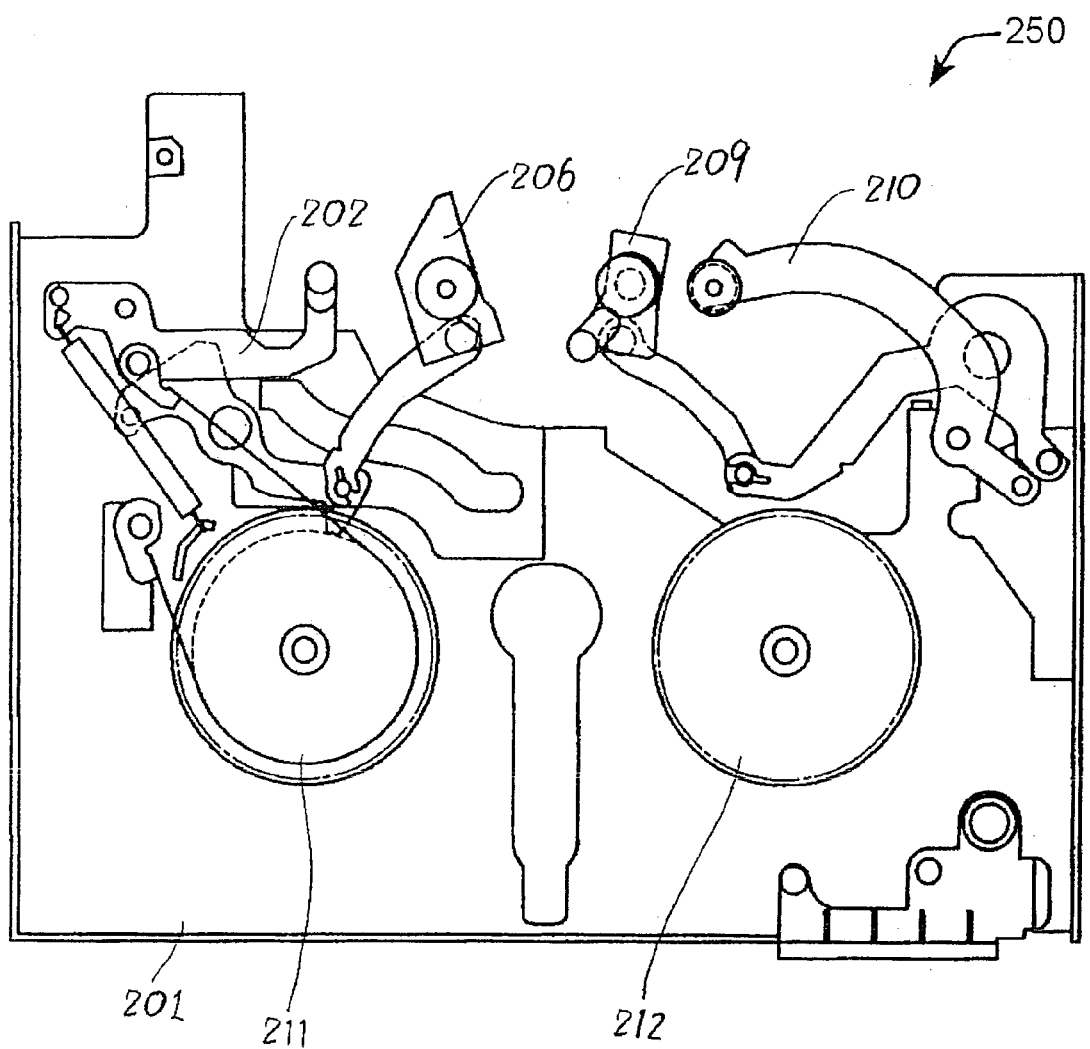
FIG. 18 is a plan view of a sub chassis unit of a conventional magnetic recording and reproduction apparatus.
Figure 19:
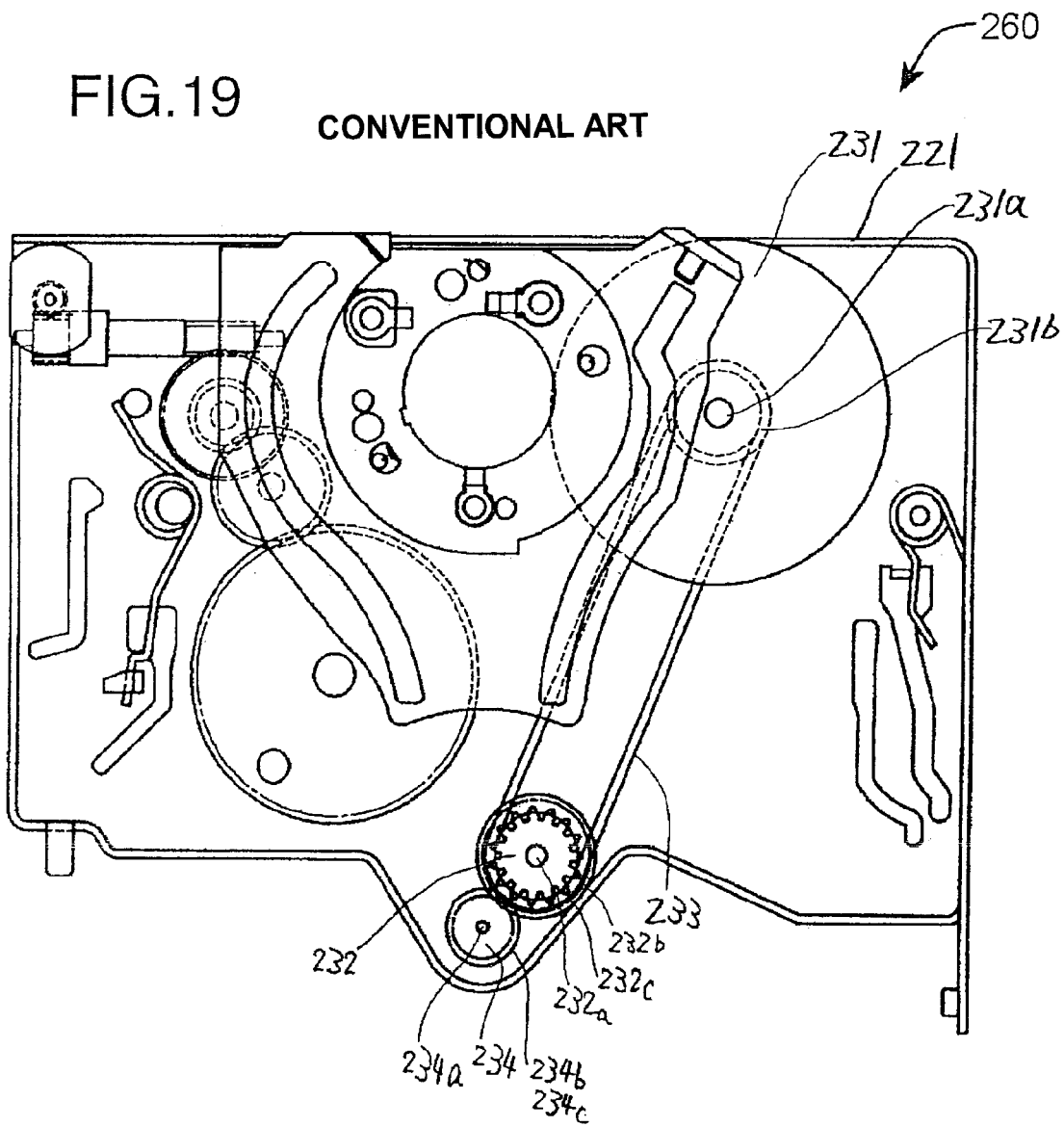
FIG. 19 is a plan view of a main chassis unit of the conventional magnetic recording and reproduction apparatus.
Figure 20:
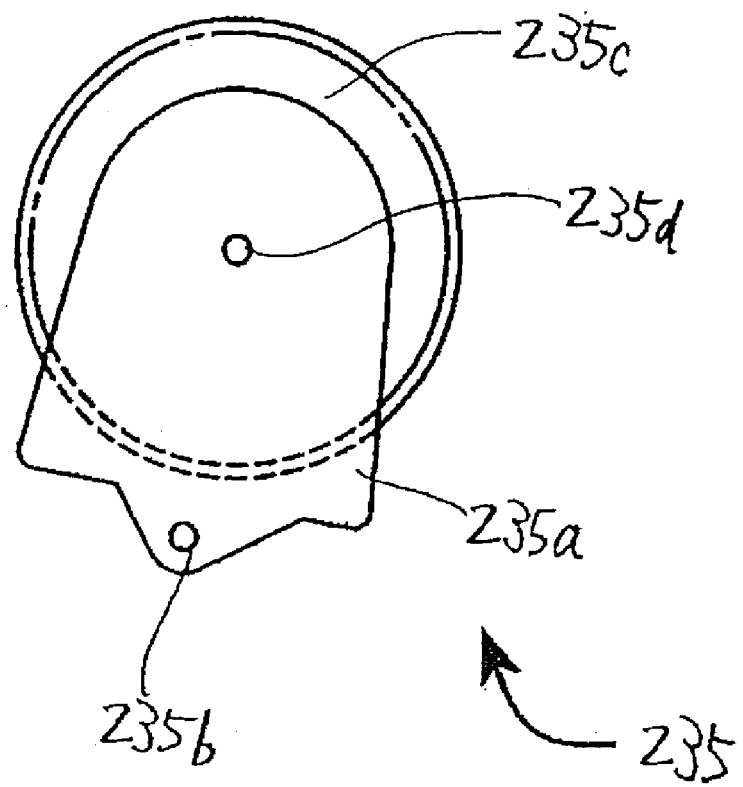
FIG. 20 is a plan view of a conventional idler.
Figure 21:
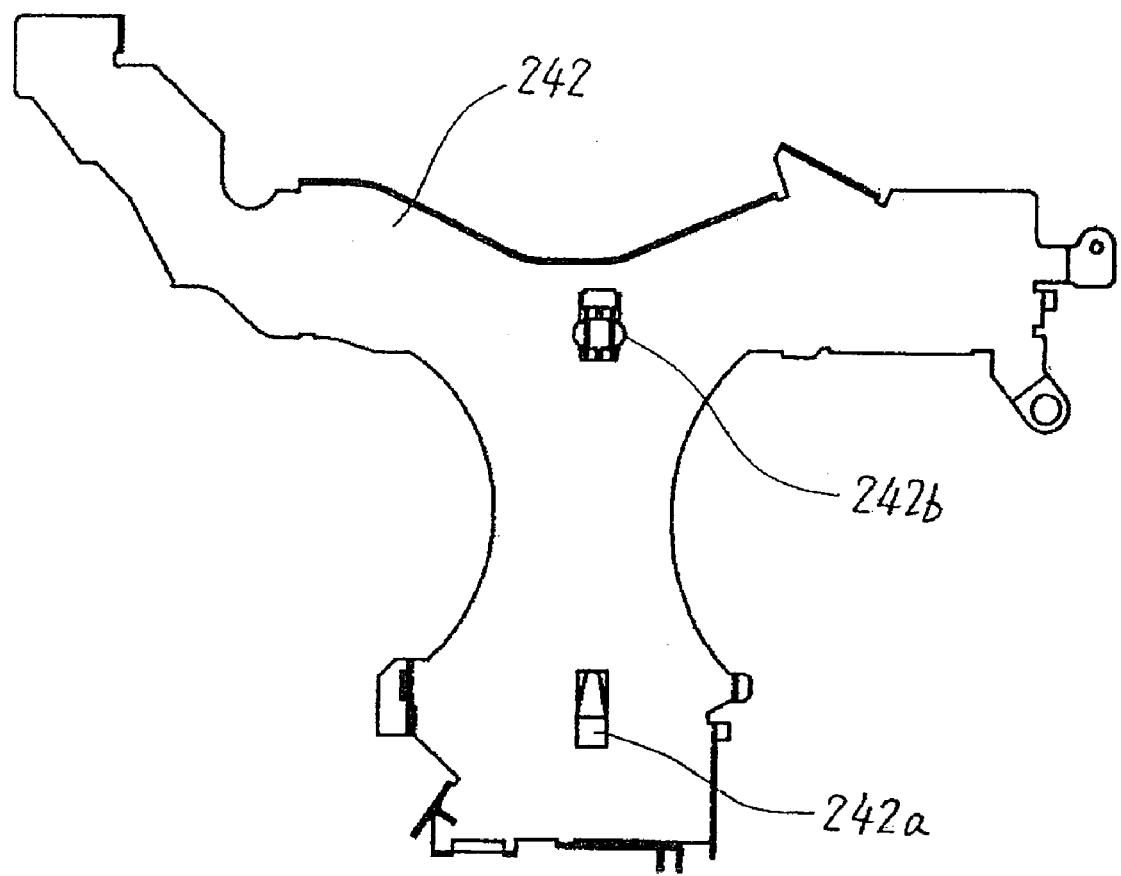
FIG. 21 is a plan view of a conventional cover plate.
Figure 22:
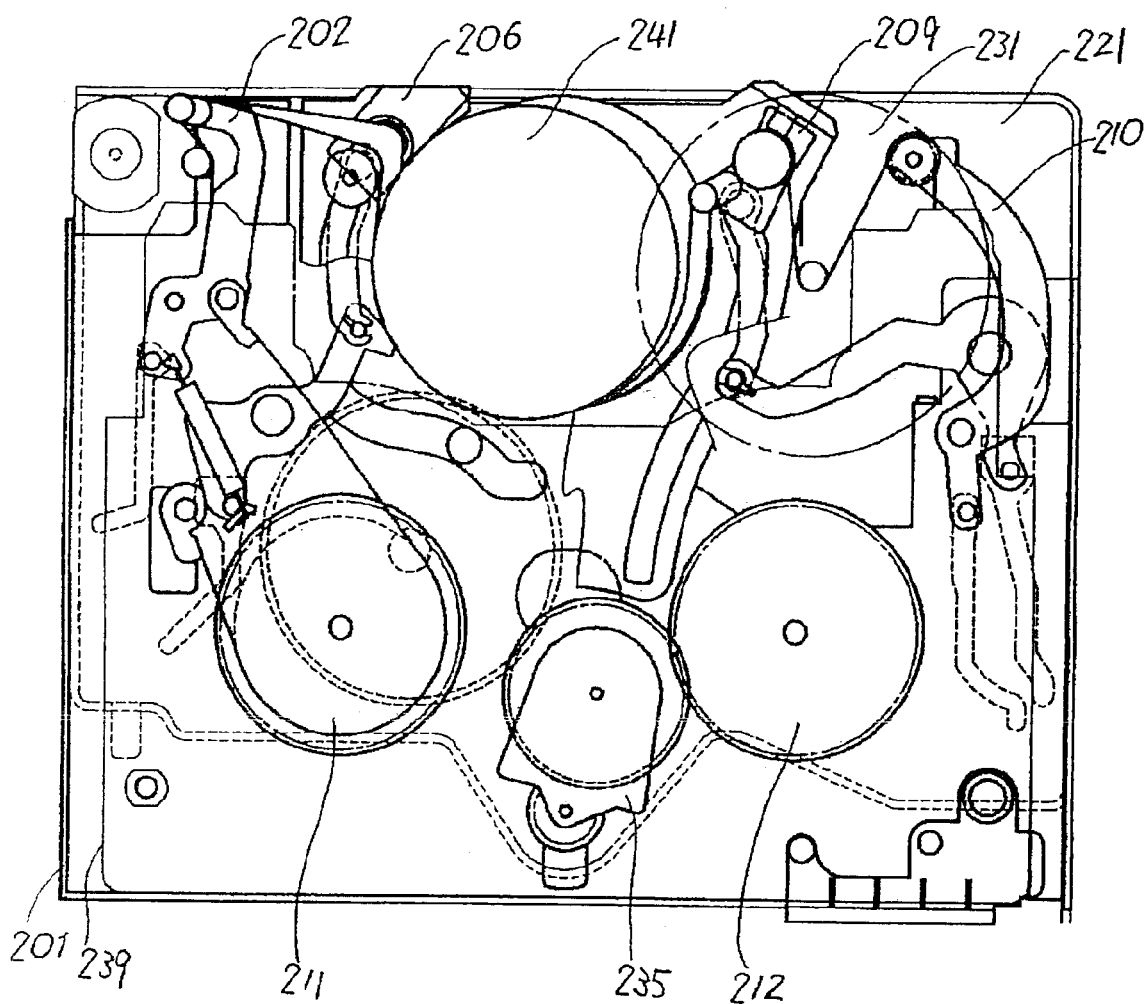
FIG. 22 is a plan view of an assembly of the sub chassis unit, the main chassis unit and the idler of the conventional magnetic recording and reproduction apparatus.
Figure 23:
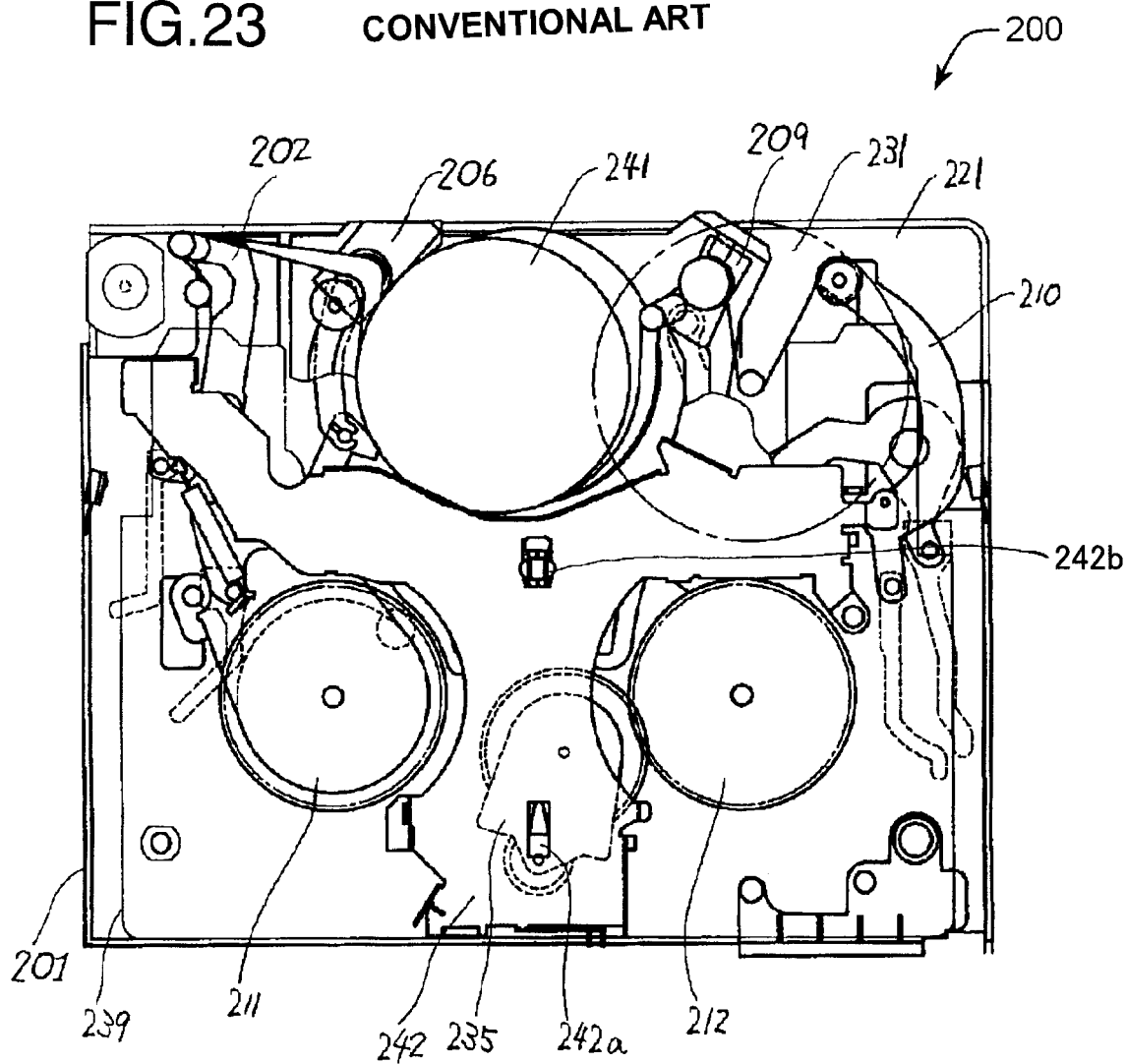
FIG. 23 is a plan view of the conventional magnetic recording and reproduction apparatus which is obtained by assembling the sub chassis unit, the main chassis unit and the idler and then attaching the cover plate to the sub chassis unit.

FIG. 17 is a plan view of a magnetic recording and reproduction apparatus 100A. The magnetic recording and reproduction apparatus 100A has the same structure as that of the magnetic recording and reproduction apparatus 100 except that one cover plate 42 includes the reel lock release member 36a, the LED 37a, and an opening 42a through which the idler 35 is mounted on the main chassis unit 60. In FIG. 17, the magnetic recording and reproduction apparatus 100A is in the middle of loading.

As described above, the cover plate 42 having the opening 42a may be used as means for allowing the idler 35 to be mounted on the main chassis unit 60 after the sub chassis unit 50 and the main chassis unit 60 are combined.

According to the present invention, the cover plate is not indispensable.

For example, the LED 37a may be directly provided on the sub chassis 1.

The reel lock release member 36a may be directly provided on the sub chassis 1.

As described above, according to the present invention, a sub chassis unit includes a reel lock release member and a light emitting device. Thus, the sub chassis unit is prepared as a large unit. The magnetic recording and reproduction apparatus is obtained by assembling the large units of the sub chassis unit and the main chassis unit. Such a magnetic recording and reproduction apparatus is produced at low cost, provides high quality, and is easily assembled and disassembled for maintenance or the like.

The reel look release member and the light emitting device can be included in the sub chassis unit. Therefore, even in the case where the main chassis unit and the sub chassis unit are produced at different sites and combined later, the magnetic recording and reproduction apparatus is produced at low cost, provides high quality, and is easily assembled and disassembled for maintenance or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus, comprising:
   a sub chassis unit on which a cassette, including a magnetic tape, a first reel, a second reel, and a reel lock member for locking the first reel and the second reel, is mountable, the sub chassis unit including a first reel stand engageable with the first reel in the state where the cassette is mounted on the sub chassis unit and a second reel stand engageable with the second reel in the state where the cassette is mounted on the sub chassis unit;
   a main chassis unit combined with the sub chassis unit, the main chassis unit including a rotatable head cylinder used for recording information to, and/or reproducing information from, the magnetic tape; and
   an idler mounted on the main chassis unit for driving the first reel stand and the second reel stand;
   wherein the sub chassis unit further comprises;
   a reel lock release member for unlocking the reel lock member of the cassette in the state where the cassette is mounted on the sub chassis unit;
   a light emitting device for emitting light for detecting a leading end and a trailing end of the magnetic tape in the state where the cassette is mounted on the sub chassis unit; and
   a section for allowing the idler to be mounted on the main chassis unit after the sub chassis unit and the main chassis unit are combined together.

2. A magnetic recording and reproduction apparatus according to claim 1, wherein the reel lock release member and the light emitting device are included proximate the section, and the reel lock release member is away from the light emitting device by a prescribed distance.

3. A magnetic recording and reproduction apparatus according to claim 1, wherein the section includes a cover plate having an opening.

4. A magnetic recording and reproduction apparatus according to claim 1, wherein the section includes a first cover plate including the reel lock release member and a second cover plate including the light emitting device.

5. A method for assembling a magnetic recording and reproduction apparatus, comprising the step of:
   providing a sub chassis unit on which a cassette, including a magnetic tape, a first reel, a second reel, and a reel lock member for locking the first reel and the second reel, is mountable, the sub chassis unit including a first reel stand engageable with the first reel in the state where the cassette is mounted on the sub chassis unit, a second reel stand engageable with the second reel in the state where the cassette is mounted on the sub chassis unit, a reel lock releasing member for unlocking the reel lock member of the cassette in the state where the cassette is mounted on the sub chassis unit, and a light emitting device for emitting light for detecting a leading end and a trailing end of the magnetic tape in the state where the cassette is mounted on the sub chassis unit;
   providing a main chassis unit, the main chassis unit including a rotatable head cylinder used for recording information to, and/or reproducing information from, the magnetic tape;
   combining the sub chassis unit and the main chassis unit; and
   mounting an idler for driving the first reel stand and the second reel stand of the sub chassis unit on the main chassis unit after the sub chassis unit and the main chassis unit are combined.

6. A method according to claim 5, further comprising the step of moving the sub chassis unit to move relative to the main chassis unit between a first position where information is recordable to, and/or information is reproduceable from, the magnetic tape, and a second position where the cassette is mountable on the sub chassis unit,
   wherein the step of mounting the idler on the main chassis unit includes the step of mounting the idler between when the sub chassis unit is at the first position and when the sub chassis unit is at the second position.

* * * * *